United States Patent
Takemura et al.

(10) Patent No.: US 10,786,732 B2
(45) Date of Patent: Sep. 29, 2020

(54) VIDEO GAME PROCESSING PROGRAM AND VIDEO GAME PROCESSING SYSTEM

(71) Applicant: SQUARE ENIX CO., LTD., Tokyo (JP)

(72) Inventors: Jun Takemura, Tokyo (JP); Yoshinori Aoyagi, Tokyo (JP); Mitsutoshi Gondai, Tokyo (JP); Tsuyoshi Yokozawa, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 336 days.

(21) Appl. No.: 15/735,826

(22) PCT Filed: Jun. 15, 2016

(86) PCT No.: PCT/JP2016/002890
§ 371 (c)(1),
(2) Date: Dec. 12, 2017

(87) PCT Pub. No.: WO2016/203765
PCT Pub. Date: Dec. 22, 2016

(65) Prior Publication Data
US 2020/0054944 A1    Feb. 20, 2020

(30) Foreign Application Priority Data
Jun. 15, 2015 (JP) .................... 2015-120618

(51) Int. Cl.
*A63F 13/35* (2014.01)
*A63F 13/67* (2014.01)
(Continued)

(52) U.S. Cl.
CPC .............. *A63F 13/35* (2014.09); *A63F 13/67* (2014.09); *A63F 13/69* (2014.09); *A63F 13/795* (2014.09);
(Continued)

(58) Field of Classification Search
CPC .......... A63F 13/35; A63F 13/67; A63F 13/69; A63F 13/795
See application file for complete search history.

(56) References Cited

U.S. PATENT DOCUMENTS 9,656,177 B2 * 5/2017 Osvald ................ G06Q 10/101
2004/0097287 A1   5/2004 Postrel
(Continued)

FOREIGN PATENT DOCUMENTS

JP    2005-270649    10/2005
JP    2006-506182    2/2006
(Continued)

OTHER PUBLICATIONS

International Search Report (ISR) from International Searching Authority (Japan Patent Office) in International Pat. Appl. No. PCT/JP2016/002890, dated Aug. 30, 2016.
(Continued)

*Primary Examiner* — William H McCulloch, Jr.
*Assistant Examiner* — Ankit B Doshi
(74) *Attorney, Agent, or Firm* — Greenblum & Bernstein, P.L.C.

(57) ABSTRACT

The present invention allows stress of a user that may occur until matching is completed when to carry out matching of a plurality of users with each other to be reduced. The users are arranged by taking into consideration a waiting time of a user who has never cleared content. When the user carries out a play request for content, the user is arranged in the content. The content in which the user is arranged is extracted by using an extraction condition regarding the waiting time of a non-cleared user. The plurality of users arranged in the content are thus matched.

20 Claims, 13 Drawing Sheets

(51) Int. Cl.
*A63F 13/69* (2014.01)
*A63F 13/795* (2014.01)
*H04L 29/08* (2006.01)
*H04L 29/06* (2006.01)
*H04L 12/863* (2013.01)

(52) U.S. Cl.
CPC ............ *H04L 67/10* (2013.01); *H04L 67/306* (2013.01); *H04L 67/42* (2013.01); *H04L 47/50* (2013.01)

(56) References Cited

U.S. PATENT DOCUMENTS

| | | |
|---|---|---|
| 2005/0192097 A1 | 9/2005 | Farnham et al. |
| 2011/0252079 A1* | 10/2011 | Werner ................ H04L 29/125 709/202 |
| 2012/0052956 A1 | 3/2012 | Yokoyama et al. |
| 2012/0270643 A1 | 10/2012 | Sienkiewicz et al. |
| 2014/0359005 A1 | 12/2014 | Ma et al. |

FOREIGN PATENT DOCUMENTS

| | | |
|---|---|---|
| JP | 2012-115534 | 6/2012 |
| JP | 2012-223583 | 11/2012 |
| JP | 2014-144367 | 8/2014 |
| JP | 2015-511155 | 4/2015 |
| JP | 2015-223480 | 12/2015 |

OTHER PUBLICATIONS

Office Action from Japan Patent Office (JPO) in Japanese Patent Appl. No. 2017-524620, dated Jun. 9, 2020, together with an English language translation.

* cited by examiner

VIDEO GAME PROCESSING PROGRAM AND VIDEO GAME PROCESSING SYSTEM

TECHNICAL FIELD

At least one of embodiments according to the present invention relates to a video game processing program and a video game processing system for causing a server to realize functions to control progress of a video game in response to an operation of a user.

BACKGROUND ART

Heretofore, various kinds of systems for carrying out matching of a plurality of users (players) who participates in a video game with each other have been proposed. Here, the term "matching of a plurality of users with each other" means that a plurality of users (or characters of the users) are combined or the plurality of users is associated with each other. Namely, the plurality of users thus matched has any relationship in the video game. In this regard, as examples of the relationship constituted by the matching, there are an oppositive relationship (rivalry) and a peer relationship.

In such a system, for example, by quantifying ability by which each of the players plays the video game, players whose ability for play are rivaled are matched with each other (see Patent Document 1).

PRIOR ART DOCUMENTS

Patent Documents

Patent Document 1: Japanese Patent Application Publication No. 2014-144367

SUMMARY OF THE INVENTION

Problems to be Solved by the Invention

However, in the conventional system, there has been a case where a waiting time until matching applies stress to a user. Namely, for example, there has been a problem that, in a case where the waiting time until matching becomes longer than that expected by the user, the user may feel stress against play of a video game provided with a matching system.

It is an object of at least one of embodiments according to the present invention to solve the problem described above, and to reduce, when a plurality of users is matched with each other, stress of each of the users, which may occur until the matching is completed.

Means for Solving the Problems

According to one non-limiting aspect of the present invention, there is provided a video game processing program for causing a server to realize functions to control progress of a video game in response to an operation of a user, wherein the functions include: an arranging function configured to arrange a user who carries out a play request for content in the video game in a frame corresponding to the content; a matching function configured to carry out matching of a plurality of users arranged by the arranging function in turn from a head of a line, the line being constituted in the frame by the plurality of users, each of the plurality of uses satisfying a predetermined matching condition; and an extracting function configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting function being configured to extract content that satisfies an extraction condition regarding the non-cleared user waiting time from the plurality of contents, and wherein the arranging function includes a function configured to arrange the user corresponding to the play request in which any content is not specified in a frame corresponding to at least one content of the contents extracted by the extracting function.

According to another non-limiting aspect of the present invention, there is provided a video game processing system including a communication network, a server, and a user terminal, the video game processing system being configured to control progress of a video game in response to an operation of a user, the video game processing system including: an arranging section configured to arrange a user who carries out a play request for content in the video game in a frame corresponding to the content; a matching section configured to carry out matching of a plurality of users arranged by the arranging section in turn from a head of a line, the line being constituted in the frame by the plurality of users, each of the plurality of uses satisfying a predetermined matching condition; and an extracting section configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting section being configured to extract content that satisfies an extraction condition regarding the non-cleared user waiting time from the plurality of contents, and wherein the arranging section is configured to arrange the user corresponding to the play request in which any content is not specified in a frame corresponding to at least one content of the contents extracted by the extracting section.

According to still another non-limiting aspect of the present invention, there is provided a video game processing program for causing a user terminal to realize functions to control progress of a video game in response to an operation inputted to the user terminal by a user, wherein a server includes: an arranging function configured to arrange a user who carries out a play request for content in the video game in a frame corresponding to the content; a matching function configured to carry out matching of a plurality of users arranged by the arranging function in turn from a head of a line, the line being constituted in the frame by the plurality of users, each of the plurality of uses satisfying a predetermined matching condition; and an extracting function configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting function being configured to extract content that satisfies an extraction condition regarding the non-cleared user waiting time from the plurality of contents, wherein the arranging function includes a function configured to arrange the user corresponding to the play request in which any content is not specified in a frame corresponding to at least one content of the contents extracted by the extracting function, and wherein the functions include: a receiving function configured to receive information for outputting information regarding the arrangement (for example, an arrangement result) from the server.

According to each of the embodiments of the present application, one or two or more shortages are solved.

DESCRIPTION OF THE EMBODIMENTS

Hereinafter, examples of embodiments according to the present invention will be described with reference to the drawings. In this regard, various kinds of elements in an example of each embodiment, which will be described below, can appropriately be combined with each other in a range where contradiction or the like does not occur. Further, explanation of the content that will be described as an example of an embodiment may be omitted in another embodiment. Further, the content of operations and/or processing with no relationship to characteristic portions of each embodiment may be omitted. Moreover, various kinds of processing that constitute various kinds of processing flows (will be described below) may be carried out in random order in a range where contradiction or the like does not occur in the content of the processing.

First Embodiment

Figure 1:
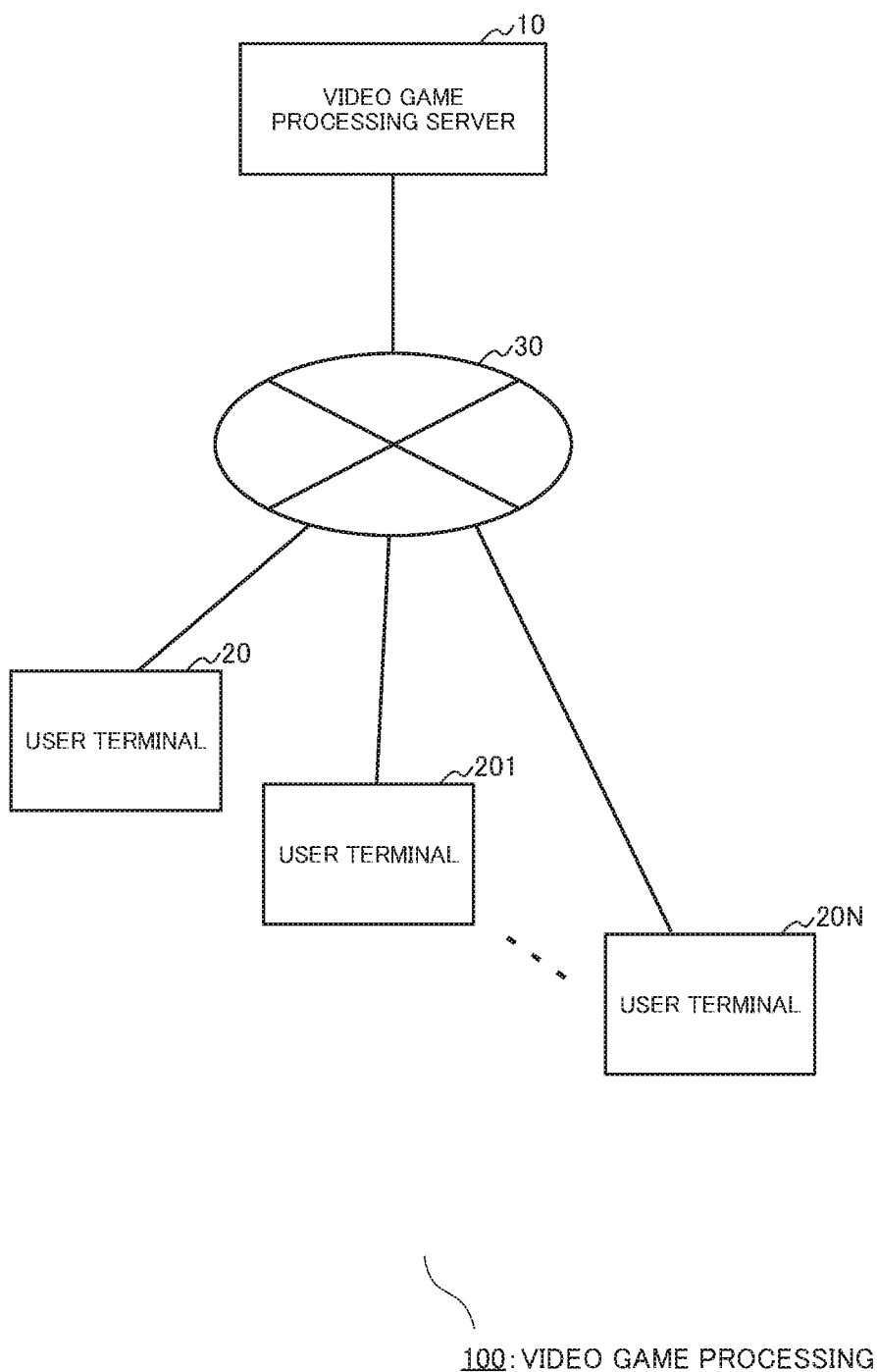
FIG. 1 is a block diagram showing an example of a configuration of a video game processing system corresponding to at least one of embodiments according to the present invention.

FIG. 1 is a block diagram showing an example of a configuration of a video game processing system 100 according to one embodiment of the present invention. As shown in FIG. 1, the video game processing system 100 includes a video game processing server 10, and user terminals 20 and 201 to 20N ("N" is an arbitrary integer) respectively used by a plurality of users (players) who play a video game. In this regard, the configuration of the video game processing system 100 is not limited to this configuration. The video game processing system 100 may be configured so that the plurality of users uses a single user terminal, or may be configured so as to include a plurality of servers.

Each of the video game processing server 10 and the plurality of user terminals 20 and 201 to 20N is connected to a communication network 30 such as the Internet. In this regard, although it is not shown in the drawings, the plurality of user terminals 20 and 201 to 20N is connected to the communication network 30 by carrying out data communication with base stations managed by a telecommunication carrier by means of a radio communication line.

The video game processing system 100 includes the video game processing server 10 and the plurality of user terminals 20, 201 to 20N, whereby various kinds of functions for controlling progress of the video game in response to an operation of the user are realized.

The video game processing server 10 is managed by an administrator of the video game processing system 100, and has various kinds of functions to provide information regarding the video game to the plurality of user terminals 20, 201 to 20N. In the present embodiment, the video game processing server 10 is constructed by an information processing apparatus, such as a WWW server, and includes a storage medium for storing various kinds of information. In this regard, the video game processing server 10 is provided with a general configuration for carrying out the video game, such as a control section and a communicating section. However, its explanation herein is omitted. Further, in the video game processing system 100, it is preferable that the video game processing server 10 manages information regarding the video game from a point of view to reduce a processing load on each of the plurality of user terminals 20, 201 to 20N. However, the storing section for storing the various kinds of information may include a storage region with a state that the video game processing server 10 can access the storage region. For example, the video game processing server 10 may be configured so as to be provided with a dedicated storage region outside the video game processing server 10.

Figure 2:
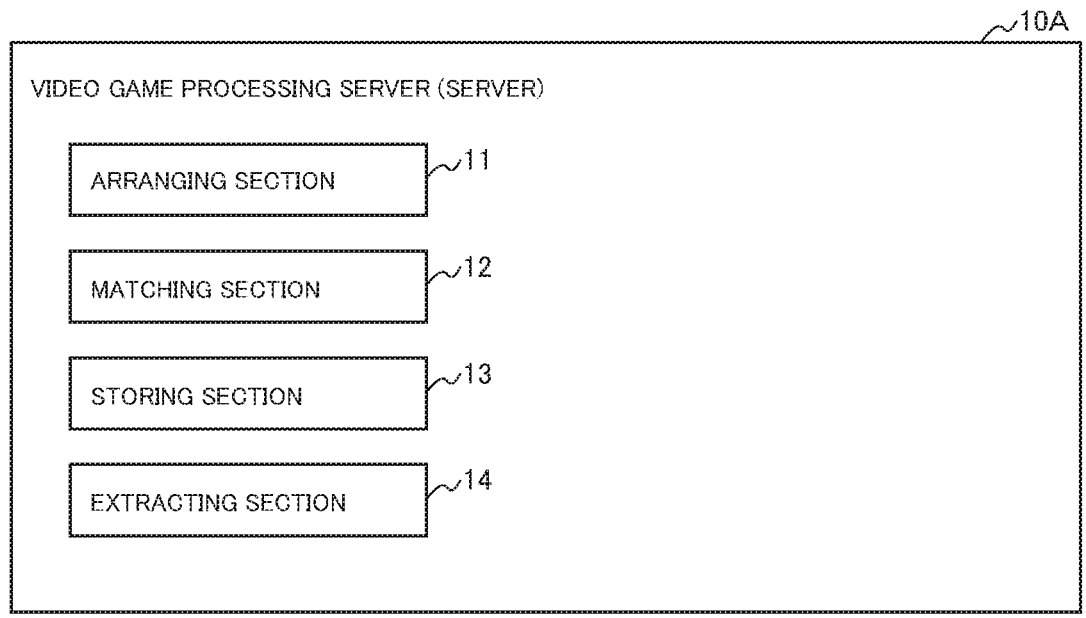
FIG. 2 is a block diagram showing a configuration of a video game processing server corresponding to at least one of the embodiments according to the present invention.

FIG. 2 is a block diagram showing a configuration of a video game processing server 10A (hereinafter, referred to as a "server 10A"), which is an example of the configuration of the video game processing server 10. The server 10A at least includes an arranging section 11, a matching section 12, a storing section 13, and an extracting section 14.

The arranging section 11 has a function to arrange a user who carries out a play request for content in the video game in a frame corresponding to the content.

Here, the term "content" means one unit of a service in the video game. The configuration of the content is not limited particularly. However, it is preferable that a termination condition thereof is defined. As examples of the content, there are content that one user plays by oneself, and content that users of a predetermined number play at the same time. Further, as examples of the content that a plurality of users plays at the same time, there are content in which the plurality of users cooperates with each other and content in which the users fight against each other.

Further, the "frame corresponding to the content" is used for matching of a plurality of users with each other on the basis of a matching condition set to the content. The number of frames corresponding to one content is not limited particularly, and may be the singular number.

Further, the term "arrange a user in a frame" means that an order is determined to arrange the user. The configuration to arrange users in the frame is not limited particularly. However, it is preferable that the configuration to arrange users in the frame is a configuration in which users are generally arranged in order that each of the users carried out a play request corresponding to the content, but exceptions can be made. In this regard, the server 10A may be configured so as not to arrange users in such a form that each of the users can recognize the arrangement in the frame, but to manage identification information of each of the users, identification information of the frame, and an order of each of the users so as to be associated with each other, for example.

The matching section 12 has a function to carry out matching of the plurality of users arranged by the arranging section 11 with each other in turn from the head of a line (or a user line) provided in the frame. The plurality of users satisfies a predetermined matching condition.

Here, the matching condition means a condition to carry out matching of the plurality of users with each other. The content of the matching condition is not limited particularly. However, it is preferable that the matching condition is related to an attribute of the user (for example, a role, a job, characteristic and the like in the video game), and is the content in which users of a predetermined number including two or more users to whom different attributes from each other are respectively set are matched with each other. As an example of the matching condition, there is a condition of "a user of an attribute A, a user of an attribute B or attribute C, and a user of an attribute D".

Further, the term "matching in turn from the head of a line" means that a plurality of users who satisfies the matching condition is determined from the head of the line arranged by the arranging section 11, and is matched. Namely, the user who is positioned at a front portion of the line is preferentially matched. In this regard, the configuration to carry out matching of the plurality of users in turn from the head of the line is not limited particularly. However, it is preferable that that server 10A is configured so as to carry out matching of a user who is positioned at the head of one of the plurality of frames with a user who is positioned at the head of each of the others of the plurality of frames in a case where a plurality of frames is associated with one content. As examples of the configuration to carry out matching of a plurality of users in turn from the head of a line, there are a configuration to judge that the users who are positioned at the heads of the plurality of frames corresponding to the content satisfy the matching condition, and a configuration to extract the plurality of users who satisfy a condition from the line.

The storing section 13 has a function to store an average matching time of each of a plurality of contents and a time that elapses since at least a user, who has never cleared the content, was arranged among users who have been arranged in the content (hereinafter, referred to as a "non-cleared user waiting time") so as to be associated with each other.

The extracting section 14 has a function to refer to the storing section 13 to extract one content or a plurality of contents on the basis of a predetermined extraction condition. In the present embodiment, the extracting section 14 has a function to extract content that satisfies an extraction condition regarding the non-cleared user waiting time (hereinafter, referred to as a "non-cleared extraction condition") from the plurality of contents.

The arranging section 11 has a function to arrange a user corresponding to a play request in which any content is not specified in a frame corresponding to at least one content of the extracted contents.

Here, the term "play request in which any content is not specified" (hereinafter, referred to as a "random request") means a play request in which one content is not specified from a plurality of existing contents. The content of the random request is not limited particularly. However, it is preferable that the content is one that the content can be restricted to an extent. As an example of the random request, there is a play request that does not contain identification information of content, but contains a kind or level of the content.

Each of the plurality of user terminals 20, 201 to 20N is managed by a user (or a player) who plays the video game, and is configured by a communication terminal, such as a cellular phone terminal, a PDA (Personal Digital Assistants), and a mobile game device, by which the user can play a network delivery type game, for example. In this regard, the configuration of the user terminal that the video game processing system 100 can include is not limited to the examples described above. However, the user terminal may be configured so that the user can recognize the video game. As the other example of the configuration of the user terminal, there is a so-called wearable divide such as a smart watch, a combination of the wearable device and the communication terminal, and the like.

Further, each of the plurality of user terminals 20, 201 to 20N is connected to the communication network 30, and includes hardware (for example, the display device for displaying a game screen, an audio output device and the like) and software for carrying out the video game by communicating with the video game processing server 10. In this regard, each of the plurality of user terminals 20, 201 to 20N may be configured so as to be capable of directly communicating with each other without the video game processing server 10. Further, as the configuration in which each of the plurality of user terminals 20, 201 to 20N receives the user operation, each of the plurality of user terminals 20, 201 to 20N may be configured so as to include a touch panel corresponding to the game screen, for example.

Next, an operation of the video game processing system 100 (hereinafter, referred to as a "system 100") according to the present embodiment will be described.

Figure 3:
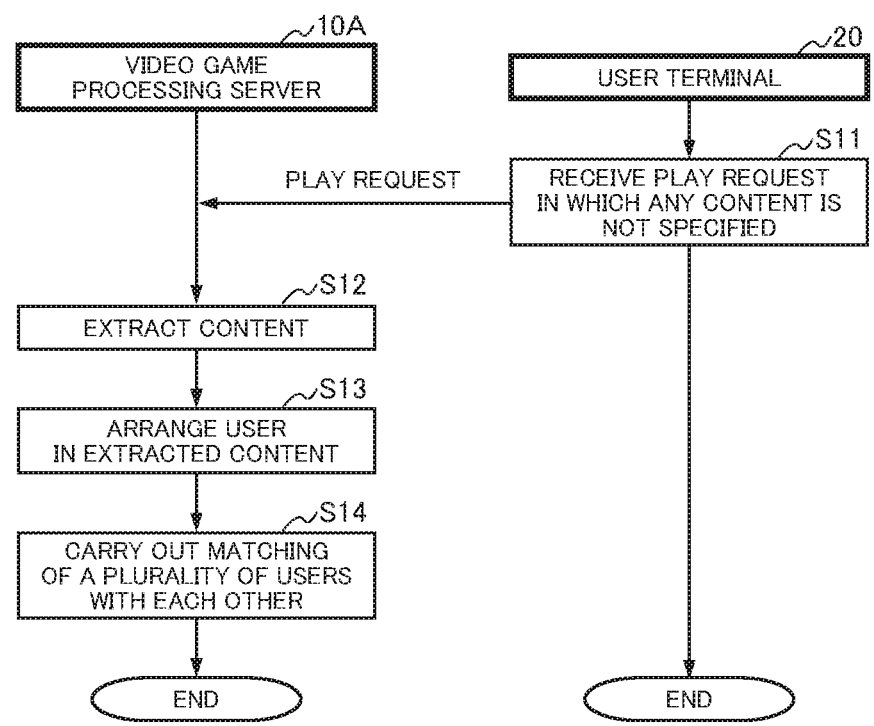
FIG. 3 is a flowchart showing an example of game processing corresponding to at least one of the embodiments according to the present invention.

FIG. 3 is a flowchart showing an example of game processing carried out by the system 100. In the game processing according to the present embodiment, a process related to matching of the plurality of users is carried out. Hereinafter, a case where the server 10A and the user terminal 20 (hereinafter, referred to as "terminal 20") carry out the game processing as a process related to a cloud game will be described as an example.

The game processing is started in a case where it becomes timing when a play request for content by the user is to be received in accordance with progress of the video game, for example. In this regard, the term "in accordance with progress of the video game" means that occurrence of various kinds of progress or changes and the like that can be generated in the video game becomes timing or a standard of a specific process. As examples of the specific process, there are a judging process, an information updating process, and the like. Further, as examples of the various kinds of progress or changes that can be generated in the video game, there are progress of time, a change in a game element value, a specific status or update of a flag, an operation input by the user, and the like.

In the game processing the terminal 20 receives a play request in which any content is not specified (Step S11). In the present embodiment, the terminal 20 displays a game screen by which the user can select an extraction condition regarding the content, such as a kind, a level, and the like of the content. The terminal 20 then generates a play request in response to an operation received via the game screen, and transmits the generated play request to the server 10A.

When the play request is received, the server 10A extracts content using the received play request (Step S12). In the present embodiment, the server 10A extracts contents of the predetermined number from a plurality of contents in accordance with the non-cleared extraction condition. On the other hand, when a play request is received from the user in a state where there is no non-cleared user, the server 10A extracts contents of the predetermined number from the plurality of contents in accordance with other extraction condition.

When the content is extracted, the server 10A arranges the user in each of the extracted contents (Step S13). In the present embodiment, the server 10A arranges the users who carried out the play request in a frame corresponding to an attribute of the user in each of the extracted contents. Namely, for example, in a case where the attribute of the user who carried out the play request is an attribute A and five contents are extracted, the server 10A arranges the user in the frame of the attribute A corresponding to each of the five contents.

When the user is arranged, the server 10A carries out matching of a plurality of users with the user (Step S14). In the present embodiment, the server 10A carries out matching of the plurality of users with each other using the frame corresponding to the matching condition for the content, and terminates the processing herein. Namely, for example, in a case where the matching condition set to the content is "one user with an attribute A and two users with an attribute B or an attribute C", the server 10A carries out matching of one user who is arranged at the head of the line among users arranged in a frame of the attribute A with two users who are arranged at the head of the line among users arranged in a frame of the attribute B or the attribute C. Further, in the present embodiment, the server 10A removes the matched user from the corresponding frame, and makes close the line. Then, in a case where users are respectively arranged at the heads of all frames corresponding to the content again, the server 10A carries out matching of the users with each other.

Figure 4:
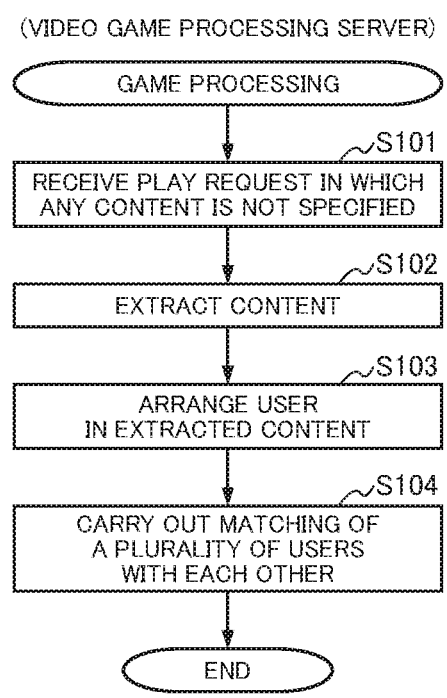
FIG. 4 is a flowchart showing an example of an operation of a server side in game processing corresponding to at least one of embodiments according to the present invention.

FIG. 4 is a flowchart showing an operation of the server 10A side in the game processing. Here, an operation of the server 10A in the video game processing system 100 will be described again.

In the game processing, the server 10A first receives a play request in which any content is not specified from the terminal 20 (Step S101), and extracts content on the basis of the received play request (Step S102).

When the content is extracted, the server 10A arranges users in the extracted content (Step S103); carries out matching of the plurality of users thus arranged with each other (Step S104); and terminates the processing herein.

Figure 5:
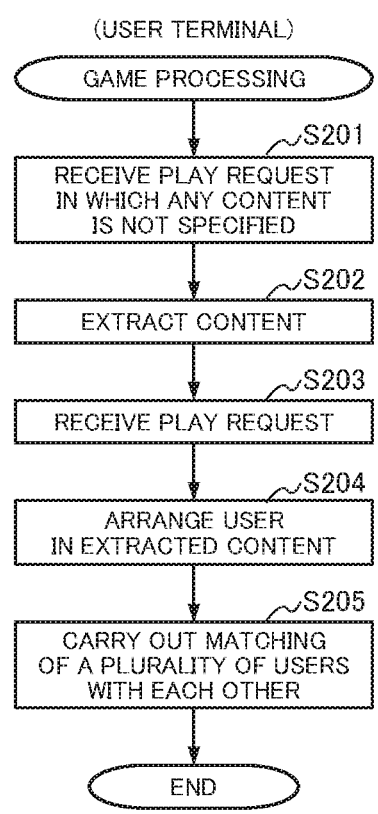
FIG. 5 is a flowchart showing an example of an operation of a terminal side in the game processing corresponding to at least one of the embodiments according to the present invention.

FIG. 5 is a flowchart showing an example of an operation of the terminal 20 side in a case where the terminal 20 carries out the game processing. Hereinafter, the case where the terminal 20 carries out the game processing will be described as an example. Namely, in the present embodiment, the case where the terminal 20 has functions of the respective sections included in the server 10A will be described.

In the game processing, the terminal 20 first receives a play request in which any content is not specified (Step S201). In the present embodiment, the terminal 20 receives a play request containing an extraction condition of content from the user who operates the terminal 20. In this regard, the terminal 20 may be configured so as to: receive a play request that does not contain the extraction condition; and adopts a predetermined extraction condition.

When the play request is received, the terminal 20 extracts content on the basis of the play request (Step S202). In the present embodiment, the terminal 20 preferentially extracts content that the user who operates the terminal 20 has never cleared in accordance with a predetermined extraction condition.

When the content is extracted, the terminal 20 receives a play request from other user (Step S203). In the present embodiment, the terminal 20 receives a play request containing information regarding other user directly from other terminal or via the server.

When the play request is received, the terminal 20 arranges a user (Step S204). In the present embodiment, the terminal 20 refers to information regarding other user, which is contained in the received play request, and arranges the other user with respect to the extracted content. In this regard, the terminal 20 may be configured so as to preferentially arrange a non-cleared user at this stage.

When the user is arranged, the terminal 20 carries out matching of a plurality of users with each other (Step S205), and terminates the processing herein. In the present embodiment, the terminal 20 carries out matching of an attribute of the user thereof with other user on the basis of the attribute of the user thereof, a matching condition set to the content specified by the user thereof, and an attribute of the arranged user. In this regard, the terminal 20 may be configured so as to preferentially carry out matching of the user of the terminal 20 with the non-cleared user at this time.

As explained above, as one side of the first embodiment, the video game processing server 10A is configured so as to include the arranging section 11, the matching section 12, and the extracting section 14. Thus, the arranging section 11 arranges the user who carried out the play request for content in the video game in the frame corresponding to the content; the matching section 12 carries out matching of the plurality of users who satisfies a predetermined matching condition with each other in turn from the head of the line that is constituted in the frame by the plurality of users thus arranged; when the play request in which any content is not specified is received, the extracting section 14 refers to the storing section 13 for storing a time that elapses since at least a user who has never cleared the arranged content of a plurality of contents in each of which the users are arranged is arranged (the non-cleared user waiting time) so as to be associated with the content to extract the content that satisfies the extraction condition regarding the non-cleared user waiting time from the plurality of contents; and the arranging section 11 arranges the user corresponding to the play request in which any content is not specified in the frame corresponding to at least one content of the extracted contents. Therefore, it is possible to reduce, when a plurality of users is matched with each other, stress of each of the users, which may occur until the matching is completed.

Namely, by effectively utilizing a play request in which any content is not specified from a point of view to support a non-cleared user, it is possible to shorten the waiting time of the non-cleared user. Therefore, it is possible to reduce stress of a user.

In this regard, it has not been mentioned particularly in the example of the first embodiment described above. However, the server 10A is configured so as to: calculate an average of a time until an arranged user is matched (that is, the average matching time); refer to the storing section 13 for storing the average matching time of each of the plurality of contents when the play request in which any content is not specified is received; and extract the content that satisfies the extraction condition regarding the average matching time from the plurality of contents. By configuring the server 10A in this manner, it is possible to effectively utilize the play request in which any content is not specified from the two points of view of a time until the user start to play and support of the non-cleared user.

Here, the content of the time required to be matched (waiting time) is not limited particularly so long as the user can recognize the time as a time required until the matching. However, it is preferable that the time is measured every attribute of the users with respect to each of the contents. As examples of the waiting time, there are a time from a time when a user inputs a play request to a time when the user starts to play content, and a time from a time when a user is arranged in content to a time when the user is matched with other user. Further, the configuration to calculate the average matching time is not limited particularly. However, it is preferable that the configuration is a configuration in which the user can calculate a value that can be recognized as a reference of a "waiting time". As examples to calculate the average matching time, there are a configuration in which users of a predetermined number utilizes a time required until matching, and a configuration in which a user who carried out a play request within a predetermined period of time utilizes a time required until matching.

Further, the content of the average extraction condition is limited particularly. However, the server 10A may be configured so as to extract one content that satisfies one condition. Alternatively, the server 10A may be configured so as to extract a plurality of contents that satisfies a plurality of conditions. As an example of the average extraction condition, there is a condition of "two contents containing content whose average matching time is the shortest and content whose average matching time is the second shortest".

In this regard, it has not been mentioned particularly in the example of the first embodiment described above. However, the server 10A may be configured so as to extract contents of the predetermined number from a plurality of contents in accordance with an extraction rule that uses the non-cleared user waiting time and the average matching time. A method of combining the non-cleared user waiting time and the average matching time is not limited particularly. However, it is preferable that the method avoids the content from not being extracted. As an example of the extraction rule, there is a rule to extract "five contents whose average matching time is shorter of contents in which a non-cleared user is waiting for five minutes or longer".

In this regard, it has not been mentioned particularly in the example of the first embodiment described above. However, the server 10A may be configured so as to preferentially arrange a non-cleared user and a user who satisfies a matching condition in a frame corresponding to the content in which the non-cleared user is arranged. By configuring the server 10A in this manner, it is possible to shorten a waiting time of the non-cleared user.

In this regard, it has not been mentioned particularly in the example of the first embodiment described above. However, the server 10A may be configured so as to extract content in which a user who carried out a play request in which any content is not specified and a non-cleared user who satisfies a matching condition are arranged. By configuring the server 10A in this manner, it is possible to shorten a waiting time of the non-cleared user.

In this regard, in the example of the first embodiment described above, the example in which the waiting time of the user who has not cleared the content is utilized has been explained. However, the condition of the user is not limited to the condition that the user has not cleared. The server 10A may be configured so as to utilize a waiting time of a user who has never played the content or a user whose number of times to play the content is a predetermined number of times or less. Further, the server 10A may be configured so as not to utilize the waiting time, but utilize the number of waiting users.

In this regard, it has not been mentioned particularly in the example of the first embodiment described above. However, the server 10A may be configured so as to remove the user from the frame in a case where the matched user is also arranged in a frame corresponding to other content. Namely, the server 10A, may be configured so as to remove the user from four other contents (that is, a so-called cue of the user is removed) when a process to control progress of one content is started in response to an operation of a user who is arranged in a plurality of contents (that is, the user who made the cue to the plurality of contents). By configuring the server 10A in this manner, it is possible to prevent one user from matching in a plurality of contents at the same time.

Second Embodiment

Figure 6:
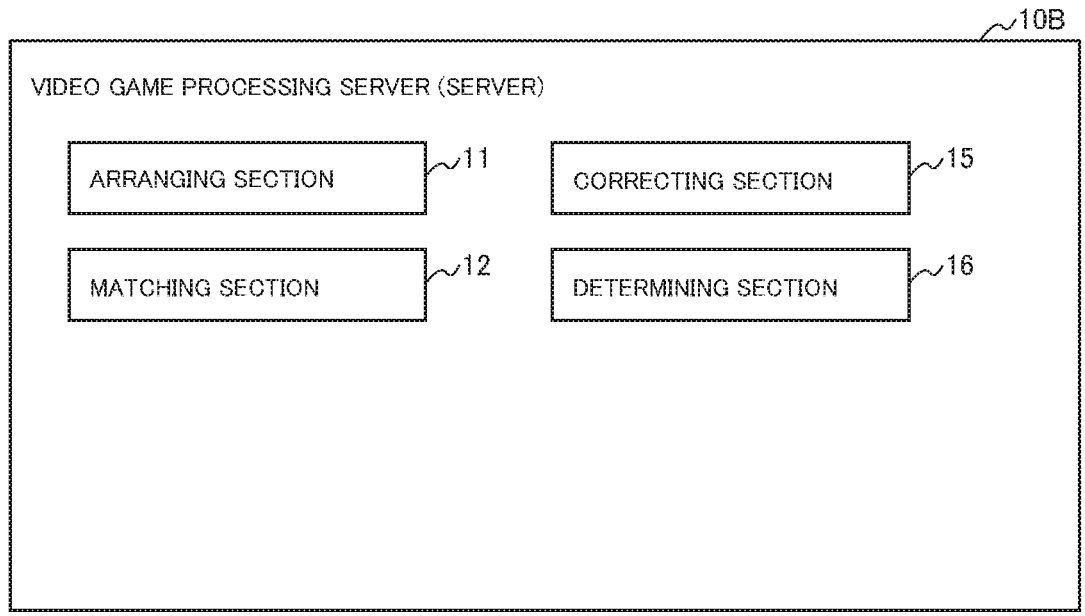
FIG. 6 is a block diagram showing a configuration of the video game processing server corresponding to at least one of the embodiments according to the present invention.

FIG. 6 is a block diagram showing a configuration of a video game processing server 10B (hereinafter, referred to as a "server 10B"), which is an example of the video game processing server 10. In the present embodiment, the server 10B at least includes an arranging section 11, a matching section 12, a correcting section 15, and a determining section 16.

The correcting section 15 has a function to correct a numeral value regarding a user who is arranged in content on the basis of a value set to the content.

Here, the term "numeral value regarding the user" means a numeral value related to the user in a video game. As examples of the numeral value regarding the user, there are a so-called level, a status, and a parameter.

Further, the term "value set to the content" means a value set to each of a plurality of contents that exist in one video game. As examples of the value set to the content, there are a so-called degree of difficulty, an aptitude level, or a status and a parameter of the user.

Further, the term "correct" means that a numeral value regarding the user is changed in accordance with a situation. The configuration to correct the numeral value regarding the user is not limited particularly. However, it is preferable that the configuration is a configuration in which a user before playing the content can recognize a value after correction. As an example of the configuration to correct the numeral value regarding the user, there is a configuration in which a level of the user is matched with an aptitude level set to content in a case where the aptitude level exceeds the level of the user.

The determining section 16 has a function to determine a bonus when the user played or cleared the content (hereinafter, referred to as a "correction bonus") on the basis of a value before correction and a value after correction (hereinafter, referred to as a "corrected value") of the numeral value regarding the user.

Here, the term "bonus" means a privilege to be given to the user. The content of the correction bonus is not limited particularly. However, it is preferable that the correction bonus is one that can become a reason for the user to allow the correction. As examples of the correction bonus, there are a so-called experience value and an in-game item. Further, the configuration to determine the correction bonus is not limited particularly. However, it is preferable that the content of the correction bonus is made different in accordance with a size of difference between one before correction and one after correction. As an example of the configuration to determine the correction bonus, there is a configuration in which the content of the bonus is determined using a difference between a value regarding the user before correction and a value regarding the user after the correction (for example, a value set to the content). In this case, the server 10B may be configured so as to calculate a bonus using a formula in which the difference is used as a variable. Alternatively, the server 10B may be configured so as to refer to a table in which the content of a bonus is associated with a range of the difference to select a bonus.

Further, the correction bonus is given to the user when the user plays or clears the content in a state where a numeral value after correction is set to the user himself or herself. Namely, in a case where the user does not allow the corrected value and cancels the play request for content, for example, the numeral value regarding the user is not corrected and the correction bonus is not given to the user.

Figure 7:
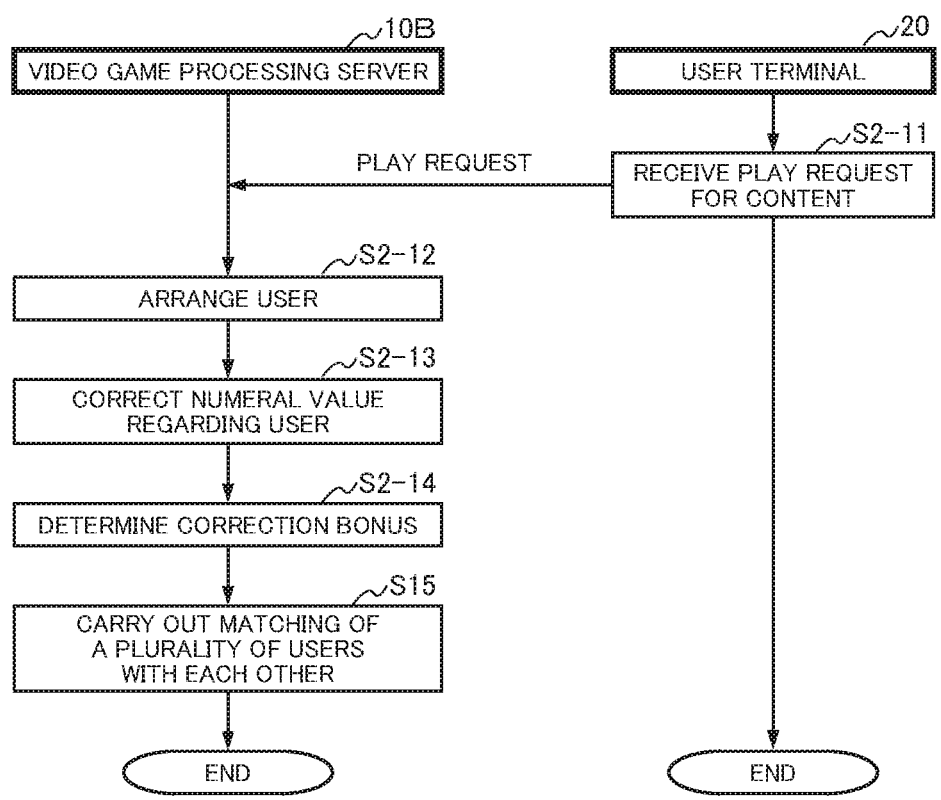
FIG. 7 is a flowchart showing an example of the game processing corresponding to at least one of the embodiments according to the present invention.

FIG. 7 is a flowchart showing an example of the game processing carried out by the system 100. Hereinafter, an operation of the server 10B and the terminal 20 will be described as an example. In this regard, description of a flowchart that shows an operation of each of the server 10B and the terminal 20 is omitted from a point of view to avoid repeated explanation.

In the game processing, the terminal 20 receives a play request for content (Step S2-11). In the present embodiment, the terminal 20 outputs a game screen that represents identification information of the content and a matching condition; generates information regarding the received user operation (herein, operation related information) via a controller; and transmits the generated operation related information to the server 10B as the play request. Here, identification information of the content (or an extraction condition of the content), which is specified by the user, identification information of the user, and an attribute of the user are contained in the play request.

When the play request is received from the terminal 20, the server 10B arranges a user on the basis of the received play request (Step S2-12). In the present embodiment, the server 10B arranges the user who carried out the play request in a frame of the content corresponding to the identification information of the content contained in the play request.

When the user is arranged, the server 10B corrects a numeral value regarding the user (Step S2-13). In the present embodiment, the server 10B compares information regarding the content indicated by the play request with information regarding the user who carried out the play request, and corrects the numeral value regarding the user as required. In this regard, a correction result is stored in a predetermined storage region so that the server 10B is allowed to refer to the correction result when to control progress of the content in response to an operation of the user.

When the numeral value regarding the user is corrected, the server 10B determines a correction bonus (Step S2-14). In the present embodiment, the server 10B determines the correction bonus in accordance with a predetermined rule using the correction result.

As explained above, as one side of the second embodiment, the video game processing server 10B is configured so as to include the arranging section 11, the matching section 12, the correcting section 15, and the determining section 16. Thus, the correcting section 15 corrects the numeral value regarding the user arranged in the content on the basis of the value set to the content; and the determining section 16 determines the bonus when the user plays or clears the content (that is, the correction bonus) on the basis of the values before and after correction and the value after correction of the value set to the content. Therefore, it is possible to provide the user with the video game that the user can enjoy the content for a longer time.

Namely, for example, when a user who exceeds an aptitude level of given content is matched with a user who has a level equal to or less than the aptitude level of the content, it is possible to prevent taste or amusement of the content from being lowered due to a large level difference. Further, in a case where there is a user who feels a complaint with a decrease in the level, it is also possible to cancel or solve the complaint by providing the correction bonus to the user.

In this regard, in the example of the second embodiment described above, the case where the correction of the numeral value regarding the user and the determination of the correction bonus are made in accordance with the play request has been described as an example. However, the server 10B may be configured so that the correction and the determination are carried out before a play request. Namely, for example, the server 10B may be configured so as to: refer to information regarding the user of the terminal 20 in a case where the server 10B receives, from the terminal 20, a request to display a selection screen for the contents; generate a game screen in which the corrected value, the correction bonus, and the content are associated with each other; and cause the terminal 20 to display the generated game screen.

In this regard, it has not been mentioned particularly in the example of the second embodiment described above. However, the server 10B may be configured so as to: correct the numeral value regarding the user arranged in the content on the basis of a value set to the content; and adjust a bonus in accordance with the degree of correction. Here, the term "degree of correction" means a degree to which the numeral value regarding the user is changed. Further, the bonus means a privilege given to the user when the user clears the content. The configuration to adjust the bonus in accordance with the degree of correction is not limited particularly. However, it is preferable that the configuration is a configuration in which the larger the degree of difficulty to clear the content by the user becomes, the better the bonus becomes for the user. As an example of the configuration to adjust the bonus in accordance with the degree of correction, there is a configuration in which a bonus is adjusted using a formula that is constituted by a difference between a bonus before correction and a bonus after correction and a numeral value indicating the bonus as variables.

In this regard, it has not been mentioned particularly in the example of the second embodiment described above. However, the server 10B may be configured so as to: correct the numeral value regarding the user arranged in the content on the basis of the value set to the content; refer to the storing section for storing the content, the bonus, and the numeral value regarding the user so as to be associated with each other to compare the bonus that the user can obtain from the content corresponding to the numeral value before correction with the bonus that the user can obtain from the content in which the user is arranged; and adjust the bonus or determine a correction bonus using a comparison result. Namely, for example, the server 10B may be configured so as to: define the bonus that the user can obtain as a "bonus in a case where the user plays (or participates in) with the aptitude level" for every kind of content; calculate a difference between a "bonus in the content that meets an original level of the user who participates in the content" and a "bonus of the content in which the user participates"; and discharge the calculated difference when the content is cleared. In a case where the server 10B is configured in this manner, the server 10B may be configured so as to adjust the bonus or determine the correction bonus using the comparison result of the bonus in a case where the play request in which any content is not specified is received. Moreover, in order to encourage the user to carry out a "play request in which any content is not specified" further, the server 10B may be configured so as to give the user a bonus corresponding to the "play request in which any content is not specified" separately.

Third Embodiment

Figure 8:
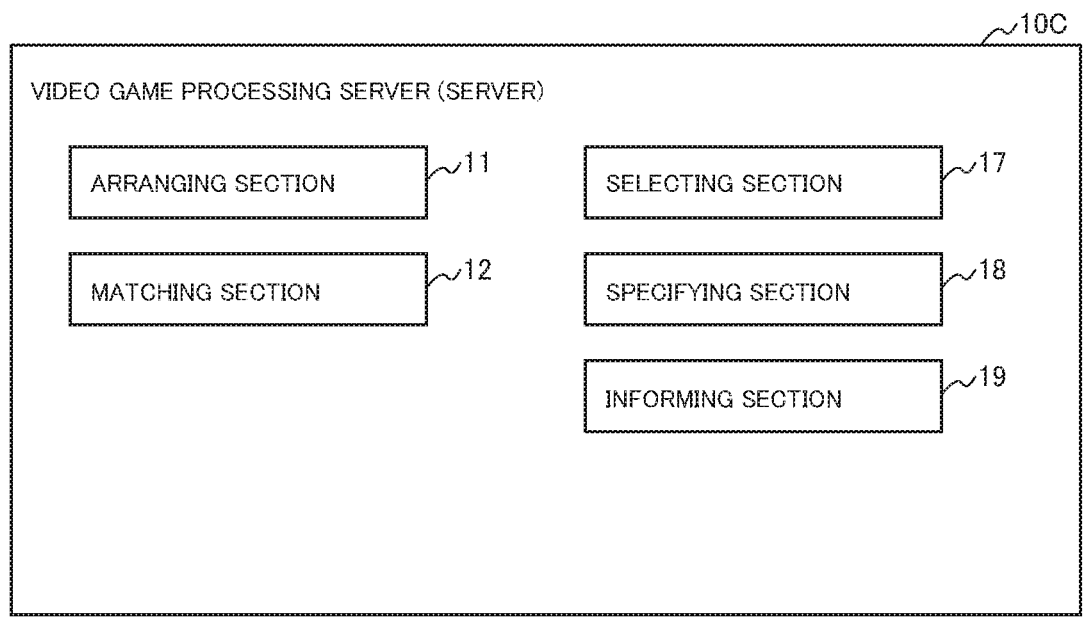
FIG. 8 is a block diagram showing a configuration of the video game processing server corresponding to at least one of the embodiments according to the present invention.

FIG. 8 is a block diagram showing a configuration of a video game processing server 10C (hereinafter, referred to as a "server 10C"), which is an example of the video game processing server 10. In the present embodiment, the server 10C at least includes an arranging section 11, a matching section 12, a selecting section 17, a specifying section 18, and an informing section 19.

The selecting section 17 has a function to select an attribute that satisfies a lacking condition with respect to content (hereinafter, referred to as a "lacking attribute").

Here, the term "lacking condition with respect to content" means a condition set to judge whether users arranged in the content are in short (or lack) or not. The content of the lacking condition is not limited particularly. However, it is preferable that the lacking condition is one in which a process to select a lacking attribute does not become excessive. As an example of the lacking condition, there is an "attribute corresponding to a frame in which the number of arranged users is a predetermined number or less". Namely, for example, in a case where with respect to content whose matching condition is "one user with an attribute A, and two users with an attribute B or attribute C", no user is arranged in a frame for the attribute A, the attribute A is selected as a lacking attribute.

Further, the term "attribute" means a characteristic that is set to the user or the character operated by the user. In this regard, the server 10C may be configured so that an attribute set to an object related to the user (including a character) is treated as an "attribute of the user". The content of the attribute is not limited particularly. However, it is preferable that the user can easily distinguish each of plural kinds of attributes. As an example of the attribute, there is a part (or role) in the video game.

The specifying section 18 has a function to specify a bonus when the user to whom the same attribute as the lacking attribute is set plays or clears the content (hereinafter, referred to as a "lacking attribute bonus").

Here, the lacking attribute bonus means one that is given to a user who sets an attribute that satisfies a lacking condition and plays content. The content of the lacking attribute bonus is not limited particularly. However, it is preferable that the lacking attribute bonus is one by which the user may be motivated to select a lacking attribute. As examples of the lacking attribute bonus, there area so-called experience value and an in-game item. Further, the configuration to determine the lacking attribute bonus is not limited particularly. However, it is preferable that the configuration is a configuration in which the content is made different in accordance with the degree of shortage (or lack). As an example of the configuration to determine the lacking attribute bonus, there is a configuration in which the content of a bonus is determined using the number of other users who wait for a user to whom a lacking attribute is set (that is, the number of users to whom any attribute other than the lacking attribute is set among the users arranged in the content).

The informing section 19 has a function to inform the user associated with the content of the lacking attribute and the lacking attribute bonus.

Here, the term "inform the user of the lacking attribute and the like" means that the user is caused to recognize at least its presence about the lacking attribute and the like. The configuration to inform the user of the lacking attribute and the like is not limited particularly. However, it is preferable that the configuration is a configuration by which the user can recognize the content, the lacking attribute, and the lacking attribute bonus. As an example of the configuration to inform the user of the lacking attribute and the like, there is a configuration in which the terminal 20 is caused to display a game screen so that the content, the lacking attribute, and the lacking attribute bonus are associated with each other.

Figure 9:
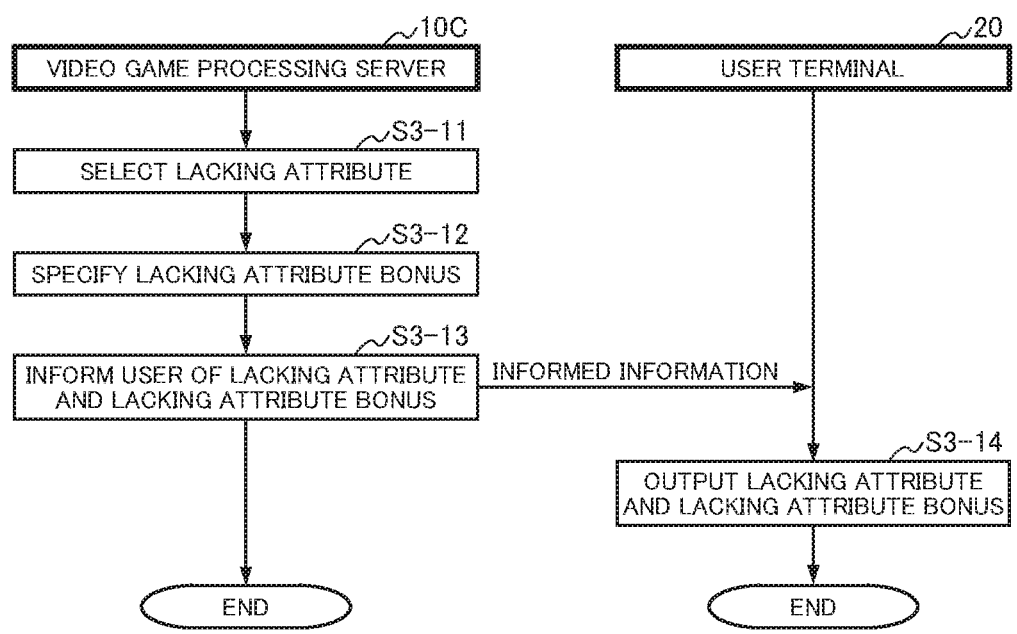
FIG. 9 is a flowchart showing an example of the game processing corresponding to at least one of the embodiments according to the present invention.

FIG. 9 is a flowchart showing an example of the game processing carried out by the system 100. Hereinafter, an operation of the server 10C and the terminal 20 will be described as an example. In this regard, description of a flowchart that shows an operation of each of the server 10C and the terminal 20 is omitted from a point of view to avoid repeated explanation.

In the game processing, the server 10C selects a lacking attribute (Step S3-11). In the present embodiment, the server 10C selects an attribute that satisfies a predetermined lacking condition from a plurality of attributes respectively corresponding to the contents.

When the lacking attribute is selected, the server 10C specifies a lacking attribute bonus corresponding to the selected lacking attribute (Step S3-12). In the present embodiment, the server 10C judges a lacking degree of the selected lacking attribute on the basis of the number of users, and specifies the lacking attribute bonus on the basis of a judgement result.

When the lacking attribute bonus is specified, the server 10C informs the user of the selected lacking attribute and the specified lacking attribute bonus (Step S3-13). In the present embodiment, the server 10C generates information for informing (or notifying) the lacking attribute corresponding to each of a plurality of contents contained in the video game and the lacking attribute bonus (hereinafter, referred to as "informed (or notified) information") to the user, and transmits the generated informed information to the terminal 20.

When the informed information is received from the server 10C, the terminal 20 outputs the lacking attribute and the lacking attribute bonus (Step S3-14). In the present embodiment, the terminal 20 displays a game screen on the basis of the informed information thus received.

As explained above, as one side of the third embodiment, the video game processing server 10C is configured so as to include the arranging section 11, the matching section 12, the selecting section 17, the specifying section 18, and the informing section 19. Thus, the selecting section 17 selects the attribute that satisfies the lacking condition with respect to the content (the lacking attribute); the specifying section 18 specifies the bonus (the lacking attribute bonus) when the user to whom the same attribute as the lacking attribute is set plays or clears the content; and the informing section 19 informs the user of the lacking attribute and the lacking attribute bonus associated with the content. Therefore, it is possible to correct a deviation of the attributes selected by the users, and this makes it possible to speed up the matching.

In this regard, it has not been mentioned particularly in the example of the third embodiment described above. However, the server 10C may be configured so as to select, as the lacking attribute, an attribute of which a time that elapses until a user with the selected attribute is matched after the user is arranged in the content is assumed to be shorter than that of other attribute corresponding to the content. By configuring the server 10C in this manner, it is possible to select, in a case where the video game contains a plurality of contents, a lacking attribute with the same process as each of all of the contents.

In this regard, it has not been mentioned particularly in the example of the third embodiment described above. However, the server 10C may be configured so as to: store the lacking attribute in a predetermined storage region so as to be associated with the content and the selected period; when a play request is received, refer to a storage region to give, in a case where the attribute set to the user who carried out the play request or the character operated by the user is consistent with any of the latest lacking attribute and the lacking attributes before the predetermined number from the latest one among the lacking attributes corresponding to the content indicated by the play request, the lacking attribute bonus corresponding to the consistent lacking attribute to the user when the user plays or clears the content. By configuring the server 10C in this manner, it is possible to prevent such a situation as follows, for example. Namely, the situation is a situation in which in a case where the server 10C is configured so as to update the lacking attribute bonus of each of the contents for every five minutes, the user cannot obtain the lacking attribute bonus because when a play request with respect to the content is inputted after five minutes or more elapses since the user recognized the lacking attribute, the lacking attribute and the like of the content is changed from ones when the user recognized.

Namely, for example, the server 10C and the terminal 20 may be configured so that: the server 10C transmits, to the terminal 20, information in which the content is associated with the lacking attribute bonus (herein, the lacking attribute is the attribute A); the terminal 20 displays the game screen, in which the content and the lacking attribute bonus are associated with each other, using the received information; and in a case where the user (with the attribute A) of the terminal 20 carried out a play request with respect to the content after the server 10C changed the lacking attribute bonus corresponding to the content (here, the lacking attribute is the attribute B), the server 10C specifies the lacking attribute bonus (attribute A) to be given to the user because the play request (attribute A) received from the terminal 20 is consistent with the previous lacking attribute (attribute A) of the content with respect to the latest lacking attribute (attribute B).

In this regard, it has not been mentioned particularly in the example of the third embodiment described above. However, the server 10C may be configured so as to select a plurality of attributes as the lacking attribute in a case where each of the plurality of attributes in one content satisfies the lacking condition. Further, in this case, the server 10C may be configured so as to select only one attribute of the plurality of attributes, each of which satisfies the lacking condition, as the lacking attribute. At this time, the configuration to select one attribute is not limited particularly. However, it is preferable that the configuration is a configuration in which an attribute whose degree of lack is higher is selected. In this regard, the server 10C may be configured so that the degree of lack is specified on the basis of the number of users corresponding to each of the attributes, for example.

Fourth Embodiment

Figure 10:
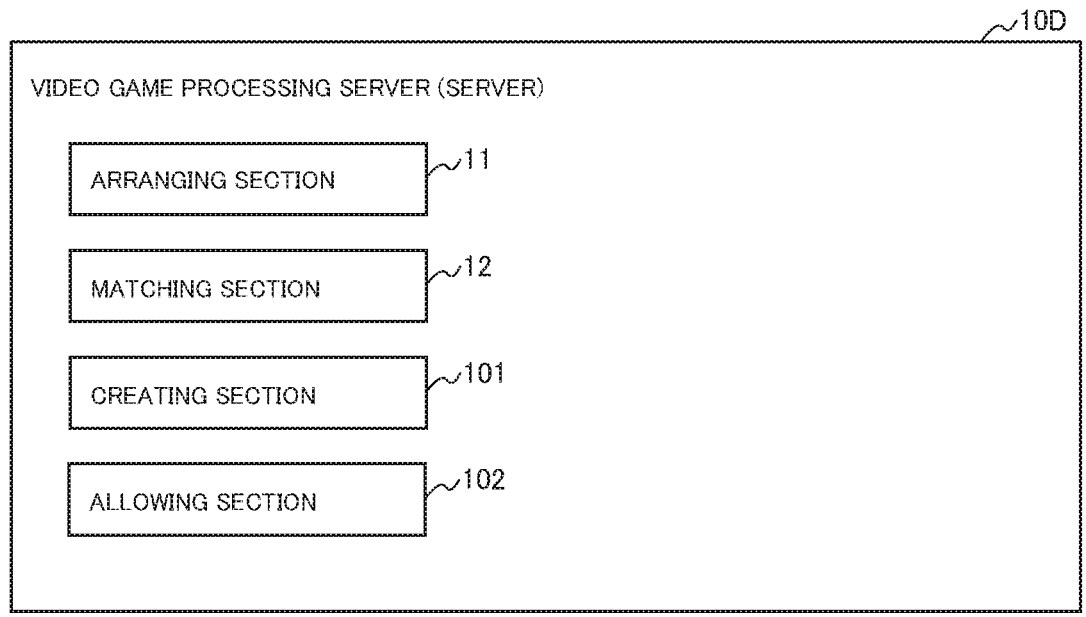
FIG. 10 is a block diagram showing a configuration of the video game processing server corresponding to at least one of the embodiments according to the present invention.

FIG. 10 is a block diagram showing a configuration of a video game processing server 10D (hereinafter, referred to as a "server 10D"), which is an example of the video game processing server 10. In the present embodiment, the server 10D at least includes an arranging section 11, a matching section 12, a creating section 101, and an allowing section 102.

The creating section 101 has a function to create a party that is composed of a plurality of users who plays a video game.

Here, the party means a group of a plurality of users. The configuration to create a party is not limited particularly. However, it is preferable that the configuration is a configuration in which a party can be created and dissolved in accordance with an operation of any of the users. Further, the server 10D may be configured so that the plurality of users matched by the function of the matching section 12 is treated as a party.

The allowing section 102 has a function to allow a party to play content in which at least a part of elements is restricted (hereinafter, referred to as "restricted content") in a case where the party that carried out a play request for content requests to play the content by users of the number fewer than the number of users set to the content.

Here, the configuration to receive a play request by users of the number fewer than the number of users set to the content (hereinafter, referred to as a "small group play request") is not limited particularly. However, it is preferable that the configuration is a configuration that selection by the user is required. As an example of the configuration to receive the small group play request, there is a configuration in which a request that only a party composed of users of the number fewer than the number of users set to content plays the content is received from the party.

Further, the content in which the part of elements is restricted means content in which various kinds of information constituting the content (elements of the content) are restricted. The configuration to restrict the elements of the content is not limited particularly. However, it is preferable that the configuration is a configuration in which a so-called play efficiency is not improved by playing the content with a small group compared with a case where the content is played with users of a normal number. As examples of the element of the content to be restricted, there are a functional element and a structural element. Here, as the functional element, there is one regarding a function realized by the system 100. As an example of the configuration to restrict the functional element, there is a case where an attribute when to play the content gets free. Further, as the structural element, there is one regarding a configuration of content. As an example of the configuration to restrict the structural element, there is a case where the user cannot obtain an in-game element (for example, a so-called drop item) that is normally obtained by playing the content.

Figure 11:
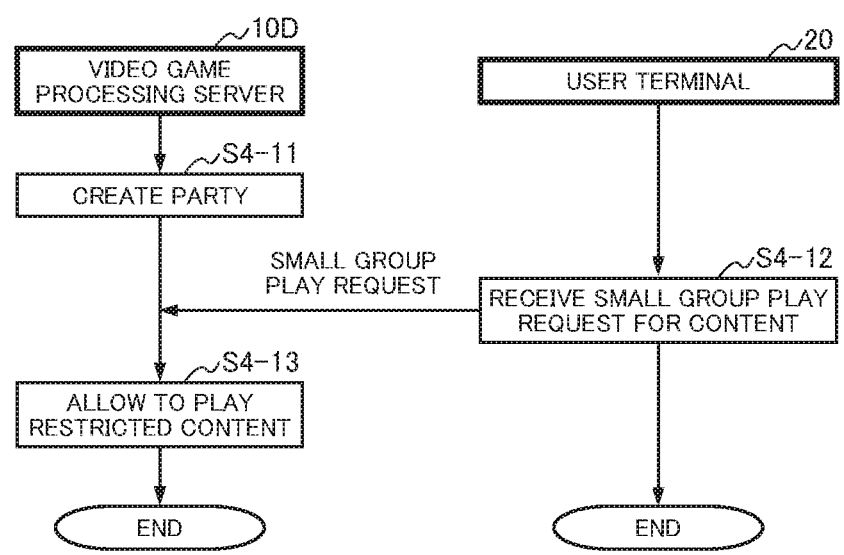
FIG. 11 is a flowchart showing an example of the game processing corresponding to at least one of the embodiments according to the present invention.

FIG. 11 is a flowchart showing an example of the game processing carried out by the system 100. Hereinafter, an operation of the server 10D and the terminal 20 will be described as an example. In this regard, description of a flowchart that shows an operation of each of the server 10D and the terminal 20 is omitted from a point of view to avoid repeated explanation.

In the game processing, the server 10D creates a party (Step S4-11). In the present embodiment, the server 10D creates a party that is composed of a plurality of users in a case where a predetermined party creating operation is received from the plurality of users. Further, in the present embodiment, the server 10D specifies a user representative of the party (hereinafter, referred to as a "representative user") in accordance with a predetermined rule.

On the other hand, the terminal 20 receives a play request by a small number of users, which specifies content, from a user who belongs to a party (Step S4-12). In the present embodiment, the terminal 20 receives an operation, which indicates content and a notice to allow users of the number fewer than the number of user set to the content to play the content, from a user representative of the party; generates information indicating the received operation as a play request; and transmits the generated play request (that is, a play request by a small number of users) to the server 10D.

When the play request by a small number of users is received from the terminal 20, the server 10D allows the party to play the restricted content (Step S4-13). In the present embodiment, the server 10D generates a virtual space corresponding to the restricted content, and provides the generated virtual space to each of the users who belong to the party.

As explained above, as one side of the fourth embodiment, the video game processing server 10D is configured so as to include the arranging section 11, the matching section 12, the creating section 101, and the allowing section 102. Thus, the creating section 101 creates the party that is composed of the plurality of users who play the video game; and the allowing section 102 allows the party to play the content in which at least a part of elements is restricted in a case where the party that carried out the play request for content requests to play with users of the number fewer than the number of users set to the content. Therefore, it is possible to bring diversity to the method of utilizing the content.

Namely, it becomes possible for the user to enjoy the content even outside of simple clear of the content, such as leading of a beginner or a speedrun with a small group.

Fifth Embodiment

Figure 12:
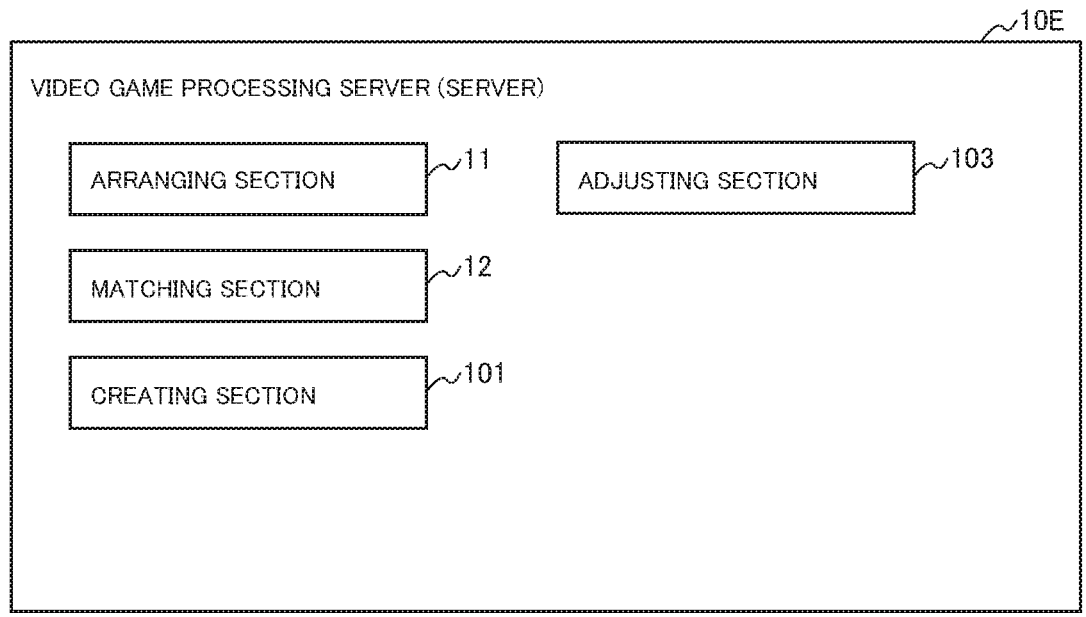
FIG. 12 is a block diagram showing a configuration of the video game processing server corresponding to at least one of the embodiments according to the present invention.

FIG. 12 is a block diagram showing a configuration of a video game processing server 10E (hereinafter, referred to as a "server 10E"), which is an example of the video game processing server 10. In the present embodiment, the server 10E at least includes an arranging section 11, a matching section 12, a creating section 101, and an adjusting section 103.

The adjusting section 103 has a function to adjust a level of an item and an element of the content in a case where a party that carries out a play request for content possesses an item whose level exceeds an item level set to the content.

Here, the item means an in-game element that a user is allowed to possess in the video game. Namely, the item is treated in a different manner from that of a numeral value set to the user or a character operated by the user (for example, a user level).

Further, the item level means a level that is set to each of a plurality of items contained in the video game. The level (item level) of each of the items influences on a performance of the item (for example, an offensive power).

Further, the term "adjust a level of an item" means that the level of the item is changed in accordance with an item level set to the content (hereinafter, referred to as an "aptitude item level"). An example of the configuration to adjust the level of the item is not limited particularly. However, it is preferable that as a result of adjustment of the item level, performance of the item used by the user becomes a degree supposed by a creator of the content. As examples of the configuration to adjust the item level, there are a configuration in which the item level that exceeds the aptitude item level is consistent with the aptitude item level, and a configuration in which a user is caused to participate in content with the minimum item level required for participation.

Further, the term "adjust the element of the content" means that various kinds of information that constitute the content (elements of the content) are changed in accordance with a predetermined rule. The element of the content to be adjusted is not limited particularly. However, it is preferable that the element is adjusted to an extent that taste or amusement of the content is not decreased. As an example of the configuration to adjust the element of the content, there is a configuration in which it is adjusted so that the user cannot obtain a reward or an experience value from an appearing monster without changing strength of the monster and a gimmick.

Figure 13:
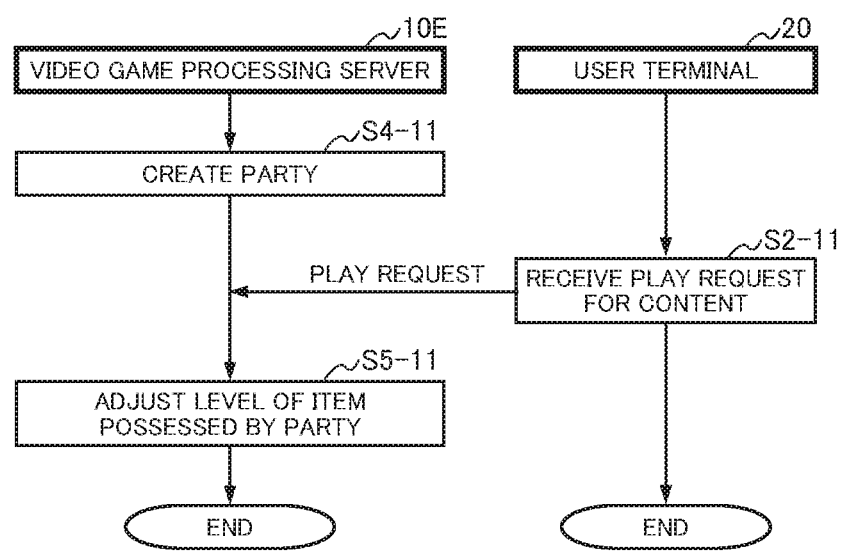
FIG. 13 is a flowchart showing an example of the game processing corresponding to at least one of the embodiments according to the present invention.

FIG. 13 is a flowchart showing an example of the game processing carried out by the system 100. Hereinafter, an operation of the server 10E and the terminal 20 will be described as an example. In this regard, description of a flowchart that shows an operation of each of the server 10E and the terminal 20 is omitted from a point of view to avoid repeated explanation.

When a play request for content is received from the terminal 20, the server 10E adjusts a level of an item possessed by a party (Step S5-11). In the present embodiment, the server 10E adjusts the level of the item possessed or equipped by each of the users so as to become the minimum item level set to the content indicated by the play request.

As explained above, as one side of the fifth embodiment, the video game processing server 10E is configured so as to include the arranging section 11, the matching section 12, the creating section 101, and the adjusting section 103. Thus, the creating section 101 creates the party that is composed of the plurality of users who play the video game; and the adjusting section 103 adjusts the level of the item and the element of the content in a case where the party that carried out the play request for content possesses an item whose item level exceeds an item level set to the content. Therefore, it is possible to bring diversity to the method of utilizing the item.

In this regard, it has not been mentioned particularly in the example of the fifth embodiment described above. However, the server 10E may be configured so that only one of increase or decrease is carried out as the adjustment of the item level. Namely, for example, the server 10E may be configured so that when a level of an item possessed by the user is adjusted to the minimum level set to the content, a level of each of items whose level is less than the minimum level is not adjusted.

In this regard, in the example of the fifth embodiment described above, the case where the element of the content is adjusted along with adjustment of the item level has been described as an example. However, the server 10E may be configured so as not to adjust the element of the content. Namely, by configuring the server 10E so that the item level is adjusted in accordance with the content, it is possible to bring diversity to the method of playing the content. On the contrary, the server 10E may be configured so that the element of the content is adjusted in accordance with a comparison result between the level of the item possessed by the user and the item level set to the content, but the item level is not adjusted. Even though the server 10E is configured in this manner, it is possible to bring diversity to the method of playing the content.

Sixth Embodiment

Figure 14:
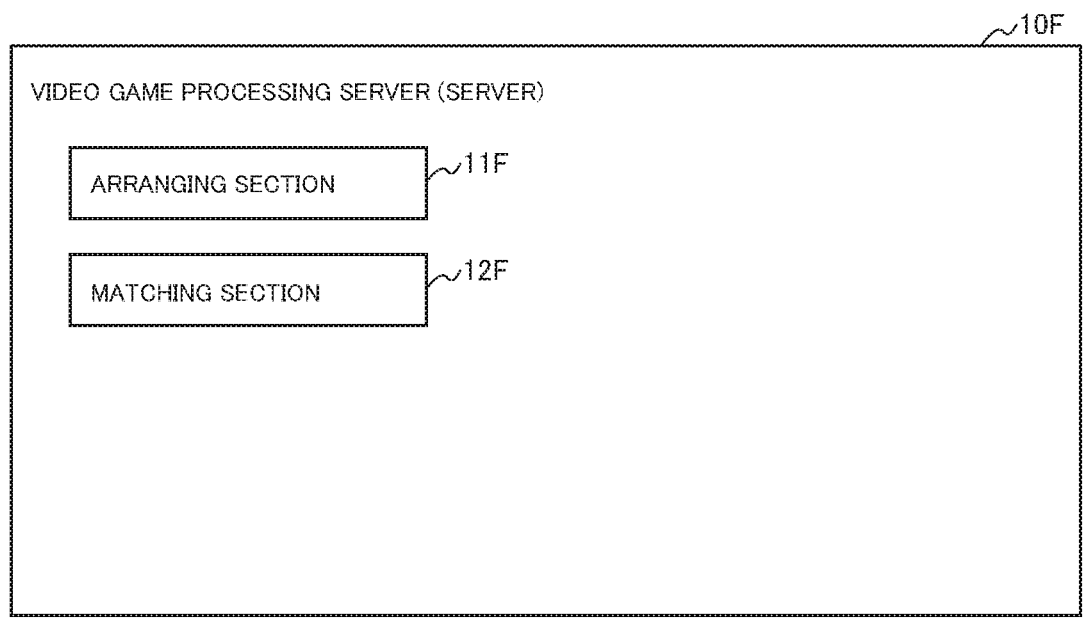
FIG. 14 is a block diagram showing a configuration of the video game processing server corresponding to at least one of the embodiments according to the present invention.

FIG. 14 is a block diagram showing a configuration of a video game processing server 10F (hereinafter, referred to as a "server 10F"), which is an example of the video game processing server 10. The server 10F at least includes an arranging section 11F and a matching section 12F.

The arranging section 11F has a function to arrange a user who carries out a play request for content in the video game in a frame corresponding to the content and an attribute set to the user or a character operated by the user.

Here, the frame corresponding to the attribute is used to carry out matching of a plurality of users with each other on the basis of a matching condition set to the content. The number of frames corresponding to one content is not limited particularly, and may be the singular number. As examples of the frame corresponding to the content, there are a frame corresponding to one kind of attribute and a frame corresponding to two kinds or more attributes.

The matching section 12F has a function to carry out matching of the plurality of users arranged by the arranging section 11F with each other in turn from the head of a line (or a user line) provided in the frame. The plurality of users satisfies at least a matching condition regarding the attribute.

Further, the arranging section 11F has a function to arrange the plurality of users in a frame corresponding to two kinds or more attributes so as to give priority to a state where the users to whom different attributes are respectively set are alternately arranged. In this regard, the configuration to arrange the users so as to give priority to the state is not limited particularly. However, it is preferable that it is a configuration in which the administrator can adjust the degree of priority. As an example of the configuration to arrange the users so as to give priority to the state, there is a configuration in which when to arrange a user from whom a play request is received, an attribute of the user is compared with attributes of one user or users of a predetermined number who are arranged at a back portion of a line, and the user is caused to cut into the line in accordance with a comparison result. Further, as another example, there is a configuration in which a line constituted by arranging users is rearranged at predetermined timing in accordance with a predetermined rule (that is, a configuration in which after arranging a user from whom a play request is received at the end of a line corresponding to an attribute of the user, the line is adjusted, or a configuration in which an order of users who have already been arranged is changed).

Figure 15:
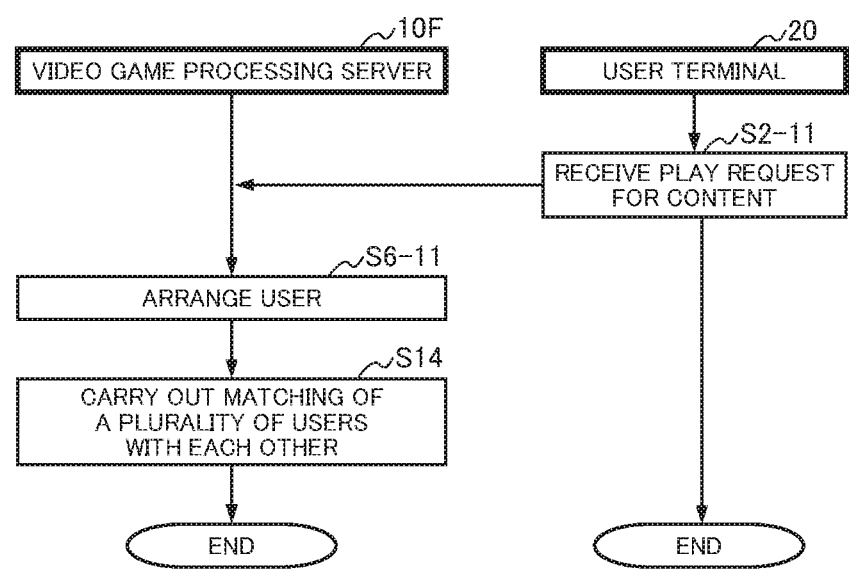
FIG. 15 is a flowchart showing an example of the game processing corresponding to at least one of the embodiments according to the present invention.

FIG. 15 is a flowchart showing an example of the game processing carried out by the system 100. Hereinafter, an operation of each of the server 10F and the terminal 20 will be described as an example. In this regard, description of a flowchart that shows an operation of each of the server 10F and the terminal 20 is omitted from a point of view to avoid repeated explanation.

When a play request is received from the terminal 20, the server 10F arranges a user on the basis of the received play request (Step S6-11). In the present embodiment, the server 10F arranges the users in a frame, which corresponds to the attribute of the user contained in the play request, of frames that are set to the content corresponding to identification information of the content contained in the play request. Further, in a case where the frame corresponding to an attribute of a user is a frame corresponding to two or more kinds of attributes, the server 10F preferentially arranges users so that the users to whom different attributes are set are alternately arranged.

As explained above, as one side of the sixth embodiment, the video game processing server 10F for controlling progress of the video game in response to an operation of the user is configured so as to include the arranging section 11F and the matching section 12F. Thus, the arranging section 11F arranges the user who carried out the play request for content in the video game in the frame corresponding to the attribute set to the user or the character operated by the user; the matching section 12F carries out matching of a plurality of users who satisfies at least the matching condition regarding the attribute in turn from the head of each of the lines constituted by the plurality of users thus arranged in the frame; and the arranging section 11F arranges the plurality of users in the frame corresponding to two kinds or more attributes so as to give priority to the state where the users to whom different attributes are respectively set are alternately arranged. This makes it possible to reduce a processing load to carry out matching of a plurality of users who satisfies a predetermined condition with each other.

Namely, in a case of carrying out matching on the basis of the matching condition regarding the attribute, it is possible to arrange the users in the frames corresponding to the attributes to carry out matching of the users with each other in turn. This makes it possible to reduce a processing load required for the matching compared with the case where users who satisfy a matching condition are searched from a plurality of users whose order is not set are matched with each other, for example.

In this regard, it has not been mentioned particularly in the example of the sixth embodiment described above. However, the server 10F may be configured so as to: refer to a storing section for storing a user and an attribute so as to be associated with each other; judge an attribute of the user who carried out a play request for content; and arrange the user in a frame (or a line that is constituted in the frame) corresponding to the content on the basis of the judged attribute (that is, the attribute of the user).

In this regard, it has not been mentioned particularly in the example of the sixth embodiment described above. However, the server 10F may be configured to: refer to a storing section for storing a user, an attribute, and other element different from the attribute (for example, an in-game element) so as to be associated with each other; and reflect the in-game element to the arrangement of the users. Here, the content of the in-game element is not limited particularly. However, the in-game element may have a correspondence relationship with the attribute (for example, a relationship of an upper rank and a lower rank). As examples of the in-game element, there are a so-called job (for example, jobs "soldier" and "knight" corresponding to an attribute "tank") and a skill. In this case, for example, the server 10F may be configured to arrange the users in the frame corresponding to one kind or more attributes so as to give priority to a state where the users to whom different in-game elements are respectively set are alternately arranged. By configuring the server 10F so as to reflect the in-game element with no relation to the matching condition to the arrangement, it is possible to bring diversity to a matching result.

In this regard, it has not been mentioned particularly in the example of the sixth embodiment described above. However, the server 10F may be configured so as to carry out a process regarding play of the content by the plurality of users thus matched. In this case, it can be said that the matching condition set to the content is a condition for the plurality of users to play the content (that is, a content play condition).

In this regard, in the example of the sixth embodiment described above, the case where there may be a frame corresponding to a plurality of attributes has been described as an example. However, the server 10F may be configured so that only one attribute corresponds to each of the frames. In this case, for example, the server 10F may be configured so as to carry out, in a case where there is no user in a specific frame, matching of a user who is arranged in other frame associated with the specific frame in advance by considering that the user arranged in the other frame is a user arranged in the specific frame. By configuring the server 10F in this manner, it is possible to speed up matching by means of the user to whom other attribute is set in a case where there is no user to whom a specific attribute is set while preferentially matching the user to whom the specific attribute is set.

In this regard, it has not been mentioned particularly in the example of the sixth embodiment described above. However, the server 10F may be configured so as to control progress of a video game, which has no relationship with the content, in response to an operation of the arranged user. Namely, for example, the server 10F may be configured so as to: arrange a user when a play request for content is received from the user whose character is positioned in a virtual space X; operate the character of the user in the virtual space X in response to an operation of the user; and cause the character of the user to move from the virtual space X to a virtual space Y corresponding to the content when the user is caused to match with other user. In this case, the server 10F may be configured so as to remove the user from the line when the attribute of the arranged user is changed before the matching.

Seventh Embodiment

Figure 16:
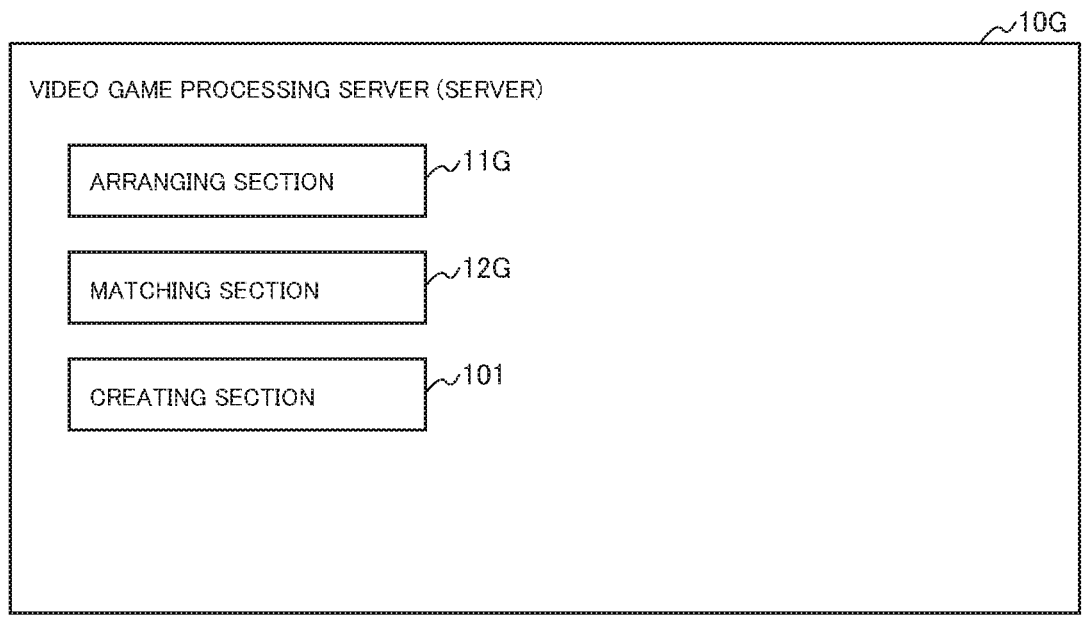
FIG. 16 is a block diagram showing a configuration of the video game processing server corresponding to at least one of the embodiments according to the present invention.

FIG. 16 is a block diagram showing a configuration of a video game processing server 10G (hereinafter, referred to as a "server 10G"), which is an example of the video game processing server 10. In the present embodiment, the server 10G at least includes an arranging section 11G, a matching section 12G, and a creating section 101.

The arranging section 11G has a function to arrange, when the plurality of users who belongs to the party that carried out the play request for content is arranged, the plurality of users while maintaining association among the plurality of users who belongs to the party.

Here, the configuration to receive the play request for content by the party is not limited particularly. However, it is preferable that the configuration is a configuration in which a play request is not received from a party that cannot fulfill the matching condition set to the content. As examples of the configuration to receive the play request for content from the party, there are a configuration to individually receive a play request for content from each of all users who belong a party and a configuration to receive a play request for content from only a representative of a party.

Further, the term "arrange users while maintaining association among the users" means that matching of only a part of the users who belong to the party with the other user is prohibited. The configuration to maintain association among the users is not limited particularly. However, it is preferable that the configuration is a configuration in which process content is not extremely complicated compared with the case where a user carries out a play request for content by solo. As an example of the configuration to maintain association among the users, there is a configuration in which in a case where a plurality of users (party users) who belongs to the same party carried out a play request for content at different timing and other user is positioned between two users of the party users in a line in which the plurality of users is arranged, the other user is caused to move before or after the party users.

The matching section 12G has a function to carry out matching of a party with other user.

Here, the term "other user" means different users from the user who belongs to the party. Namely, in a case where the other user belongs to other party, a plurality of parties is matched with each other. In this regard, the server 10G may be configured so as to prohibit the plurality of parties from being matched with each other.

Figure 17:
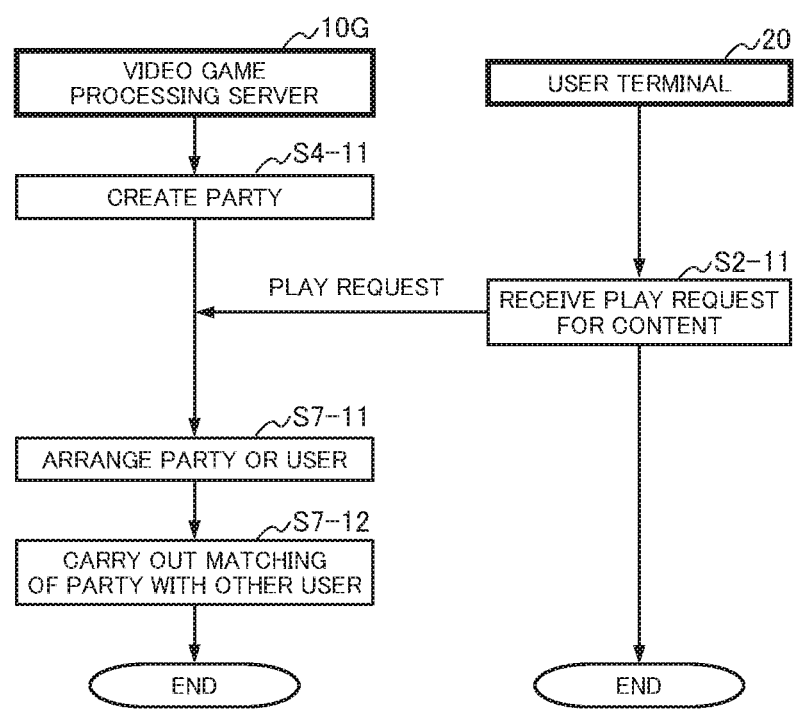
FIG. 17 is a flowchart showing an example of the game processing corresponding to at least one of the embodiments according to the present invention.

FIG. 17 is a flowchart showing an example of the game processing carried out by the system 100. Hereinafter, an operation of each of the server 10G and the terminal 20 will be described as an example. In this regard, description of a flowchart that shows an operation of each of the server 10G and the terminal 20 is omitted from a point of view to avoid repeated explanation.

When the party is created and a play request for content is received from the terminal 20, the server 10G arranges the party or the users (Step S7-11). In the present embodiment, in a case where the received play request is made by the representative user of the party, the server 10G searches information regarding the party in which the user is in charge of representative user from a predetermined storage region, and arranges each of the users in a frame corresponding to an attribute set to each of the users who belong to the party or a character operated by the corresponding user.

When the party is arranged, the server 10G carries out matching of the party with other user (Step S7-12). In the present embodiment, the server 10G carries out matching of the plurality of users with one or a plurality of other users in the frame corresponding to a matching condition for the content so that a lacking user is matched with the party while maintaining association among the plurality of users who belongs to the party.

As explained above, as one side of the seventh embodiment, the video game processing server 10G is configured so as to include the arranging section 11G, the matching section 12G, and the creating section 101. Thus, the creating section 101 creates the party composed of the plurality of users who plays the video game; the arranging section 11G arranges, when the plurality of users who belongs to the party that carried out the play request for content is arranged, the plurality of users while maintaining association among the plurality of users who belongs to the party; and the matching section 12G carries out matching of the party with other user. Therefore, it is possible to carry out matching of other necessary user with a party that cannot play the content by alone easily.

Further, as one side of the seventh embodiment described above, the server 10G is configured so as to include the arranging section 11G, the matching section 12G, and the creating section 101. Thus, the matching section 12G carries out matching of all members of the party to which the user belongs with other user when to carry out matching of anyone of the plurality of users who belongs to the party with the other user. Therefore, it is possible to realize a system that can carry out matching with other user even in a case where the user who constitutes the party does not specify other user.

In this regard, it has not been mentioned particularly in the example of the seventh embodiment described above. However, the server 10G may be configured so as to arrange other users who belong to the party by using an order of a user whose time required until matching is predicted to be the shortest among the plurality of users who belong to the party as a standard. In this case, the content of the standard for predicting that the time required until matching (prediction standard) is the shortest is not limited particularly. However, it is preferable that the standard is one in which a position of the arranged user (that is, a position of the user in the line that is constituted in the frame) is reflected.

In this regard, it has not been mentioned particularly in the example of the seventh embodiment described above. However, the server 10G may be configured so as to carry out matching of a plurality of parties thus arranged, which satisfies a matching condition regarding an attribute, in turn from the head of a line among the plurality of parties. In this case, the server 10G may be configured so that a frame in which only the parties are arranged is provided. By configuring the server 10G in this manner, it is possible to manage a user who participates in content by solo and users who assemble a party and participate in content so as to separate them from each other.

Eighth Embodiment

Figure 18:
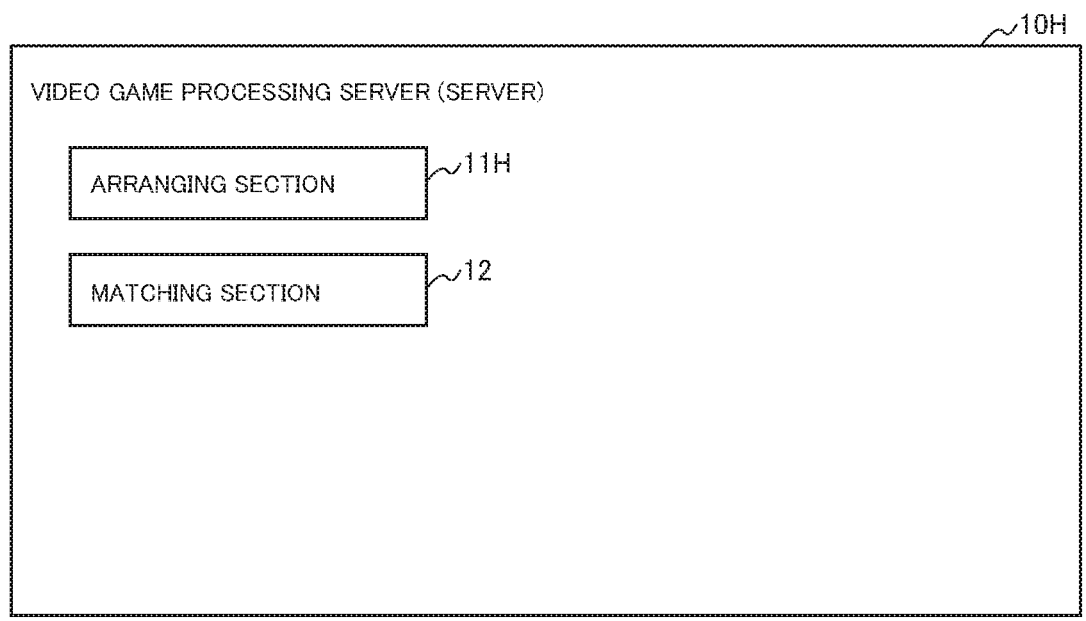
FIG. 18 is a block diagram showing a configuration of the video game processing server corresponding to at least one of the embodiments according to the present invention.

FIG. 18 is a block diagram showing a configuration of a video game processing server 10H (hereinafter, referred to as a "server 10H"), which is an example of the video game processing server 10. In the present embodiment, the server 10H at least includes an arranging section 11H, and a matching section 12.

The arranging section 11H has a function to arrange a user who has never cleared content (hereinafter, referred to as a "non-cleared user") in a frame using an arrangement rule regarding the non-cleared user in a case where the user who carried out a play request for the content has never cleared the content.

Here, the term "cleared" means that a user satisfies a clear condition set to the content. The content of the clear condition is not limited particularly. However, it is preferable that the clear condition is one that the user can recognize easily. As an example of the clear condition, there is a condition to defeat an enemy character that appears in the content.

Further, the configuration that the server 10H distinguishes the non-cleared user from other users is not limited particularly. However, it is preferable that the configuration is one that does not require self-assessment by the user. As an example of the configuration to distinguish the non-cleared user from other user, there is a configuration that user information contains a play history of the content.

Further, the arrangement rule means a rule that is used to arrange users. The rule to arrange the non-cleared user is not limited particularly so long as the non-cleared user is treated in a different manner from that for the other user. However, it is preferable that the rule is one in which a waiting time of the non-cleared user may normally become shorter.

Figure 19:
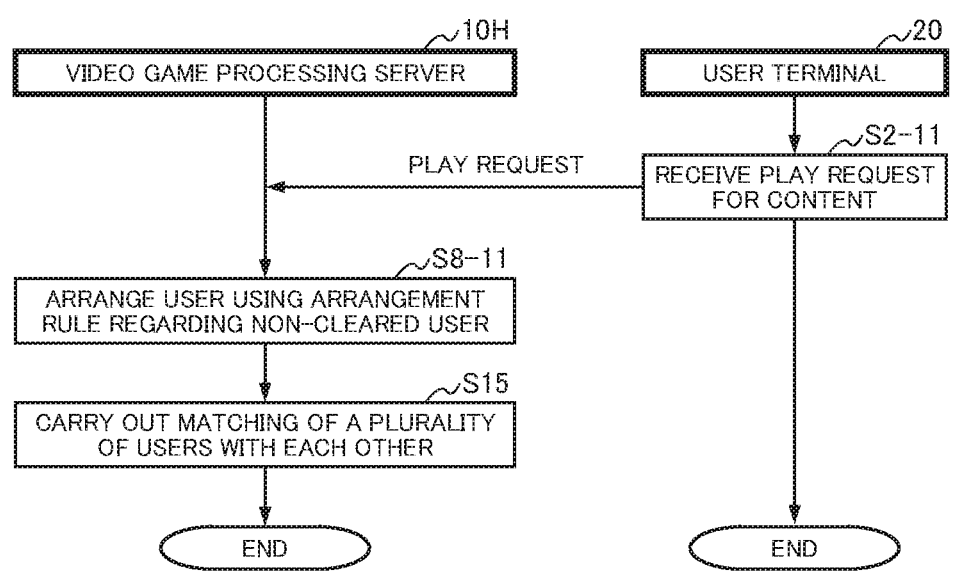
FIG. 19 is a flowchart showing an example of the game processing corresponding to at least one of the embodiments according to the present invention.

FIG. 19 is a flowchart showing an example of the game processing carried out by the system 100. Hereinafter, an operation of the server 10H and the terminal 20 will be described as an example. In this regard, description of a flowchart that shows an operation of each of the server 10H and the terminal 20 is omitted from a point of view to avoid repeated explanation.

When a play request is received, the server 10H arranges a user using an arrangement rule regarding a non-cleared user (Step S8-11). In the present embodiment, the server 10H refers to information regarding the user indicated by the received play request, and treats the user as a non-cleared user in a case where it was determined that the user cleared the content indicated by the play request.

As explained above, as one side of the eighth embodiment, the video game processing server 10H is configured so as to include the arranging section 11H and the matching section 12. Thus, the arranging section 11H arranges the user in the frame using the arrangement rule regarding the non-cleared user in a case where the user who carried out the play request for the content has never cleared the content. Therefore, it is possible to manage the non-cleared user so as to separate the non-cleared user from other users (that is, users who have an experience to clear the content).

In this regard, it has not been mentioned particularly in the example of the eighth embodiment described above. However, the server 10H may be configured to arrange a non-cleared user at a front portion of the line so that the non-cleared user is preferentially matched compared with a user who has cleared the content previously. In this case, it is preferable that an administrator side can manage a degree to give priority to the non-cleared user so that a situation that users other than the non-cleared user (hereinafter, referred to as a "clear experiencing user") is never matched does not occur. As an example of the configuration to arrange a non-cleared user at a front portion of a line, there is a configuration in which the server 10H refers to a line corresponding to an attribute of a non-cleared user in a case where a play request newly received is one from the non-cleared user; and arranges the non-cleared user at a position in back of non-cleared users who have been arranged previously but before the clear experiencing user whose waiting time is less than a predetermined period of time.

In this regard, it has not been mentioned particularly in the example of the eighth embodiment described above. However, the server 10H may be configured so as to arrange a non-cleared user using an arrangement rule regarding the waiting time of each of users who have been arranged already and the play history of the content. Here, the term "waiting time" means a time that elapses without matching the user since the user is arranged in the frame. Further, the term "play history" means a history when the user has played a video game. The content of the play history is not limited particularly. However, it is preferable that the play history contains a history regarding the content. As examples of the play history, there are the number of times to play the content, the number of times of clear, the number of times of failure, a character level, an equipment level, and a play time.

In this regard, in the example of the eighth embodiment described above, the case of using the arrangement has been described as an example. However, the server 10H may be configured so that a non-cleared user is preferentially matched compared with a user who has cleared the content before without using arrangement. In this case, for example, the server 10H may be configured so as to: search other player required for the non-cleared user to play the content without arranging the non-cleared user in the frame when it is judged that the user who received the play request is the non-cleared user; and carry out matching of the other player thus searched with the non-cleared user. In this case, a search range is not limited particularly. The search range may be users who are arranged in the frame corresponding to the content, or users who have not been arranged yet (for example, a login user).

Ninth Embodiment

Figure 20:
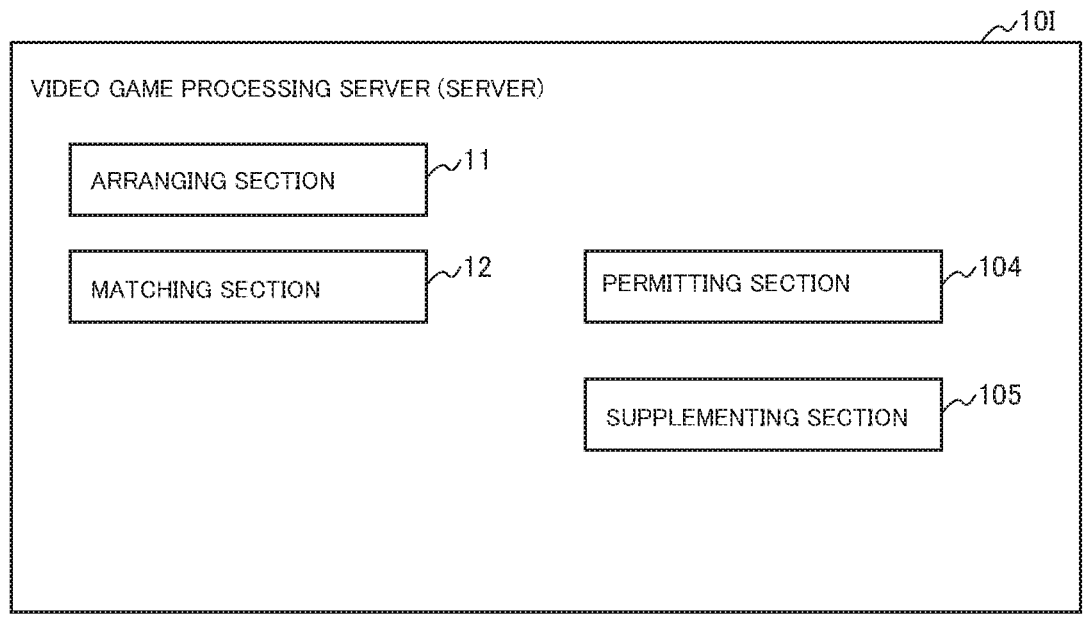
FIG. 20 is a block diagram showing a configuration of the video game processing server corresponding to at least one of the embodiments according to the present invention.

FIG. 20 is a block diagram showing a configuration of a video game processing server 10I (hereinafter, referred to as a "server 10I"), which is an example of the video game processing server 10. In the present embodiment, the server 10I at least includes an arranging section 11, a matching section 12, a permitting section 104, and a supplementing section 105.

The permitting section 104 has a function to permit a plurality of users, who are matched by the matching section 12, to play content.

Here, the term "permit a plurality of users to play content" means that the user carries out a process to play the content. The configuration to permit a plurality of users to play content is not limited particularly. However, it is preferable that each of a plurality of users can recognize that the users play the same content at the same time. As an example of the configuration to permit a plurality of users to play content, there is a configuration in which a temporary virtual space is generated for a plurality of users.

The supplementing section 105 has a function to supplement, when a user supplement condition for the content played by a plurality of users is satisfied, a user to whom an attribute to be supplemented is set and who allows to participate in the content in the middle among the users arranged in the content to the content.

Here, the term "supplement" means that that in a case where a plurality of users has not satisfied a reference set to the content, other user is supplemented so as to satisfy the reference. The configuration to supplement a user is not limited particularly. However, it is preferable that one of a user who has already played content and a supplemented user can recognize the other. As an example of the configuration to supplement a user to content, there is a configuration in which information on a temporary virtual space is provided to a user to be supplemented in a case where a plurality of players plays the content in the virtual space.

Further, the term "user supplement condition" means a condition by which a process to supplement other user to the user who is playing the content is start. The content of the user supplement condition is not limited particularly. However, it is preferable that a process required to judge satisfaction of a condition is easy. As examples of the user supplement condition, there are logout or fight impossible of a user who plays content, and action stopping for a given time.

Further, the term "user who allows to participate in the middle" means a user who allows other user to participate in the content that the user plays later. The configuration to judge whether the user is a user who allows to participate in the content in the middle or not is not limited particularly. However, it is preferable that a will of the user is reflected to the configuration. As an example of the configuration to judge whether to allow to participate in the middle or not, there is a configuration in which selection of "whether to allow to participate in the middle or not" by the user is stored.

Figure 21:
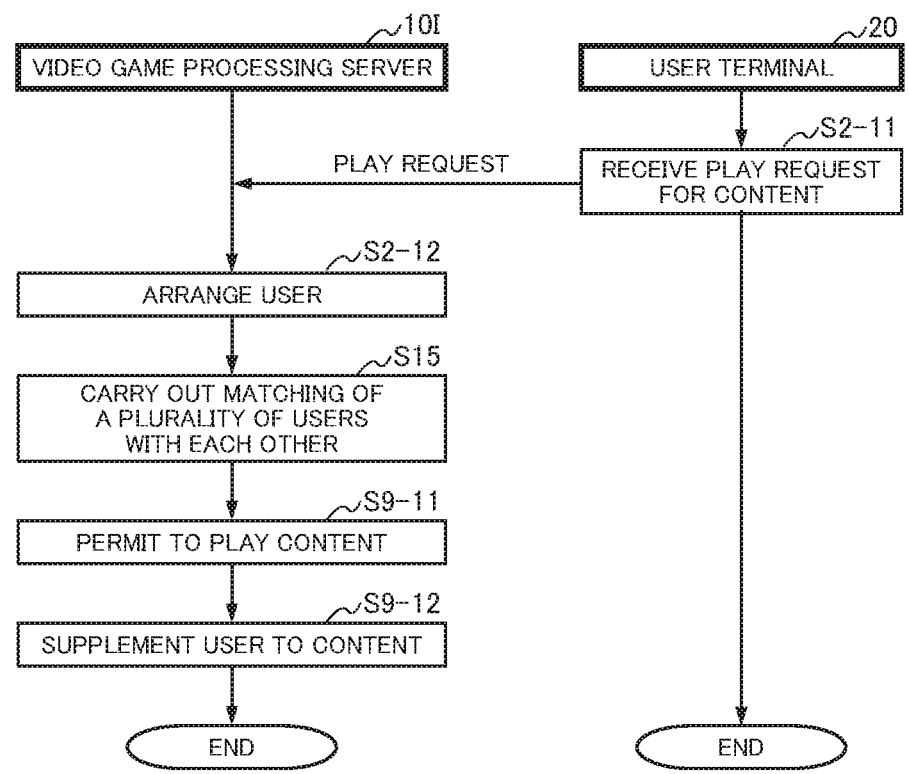
FIG. 21 is a flowchart showing an example of the game processing corresponding to at least one of the embodiments according to the present invention.

FIG. 21 is a flowchart showing an example of the game processing carried out by the system 100. Hereinafter, an operation of the server 10I and the terminal 20 will be described as an example. In this regard, description of a flowchart that shows an operation of each of the server 10I and the terminal 20 is omitted from a point of view to avoid repeated explanation.

When the server 10I carries out matching of a plurality of users who are arranged in content with each other (Step S15), the server 10I permits the plurality of users thus matched to play the content (Step S9-11). In the present embodiment, the server 10I provides information required for the plurality of users thus matched to play the content as one party to each of the users.

When the server 10I permits the users to play the content, the server 10I supplements a user to the content (Step S9-12). In the present embodiment, the server 10I refers to information regarding the plurality of users who are permitted to play the content (that is, playing users); and adds a user to whom the attribute to be supplemented is set and who allows to participate in the content in the middle to the playing users as a user to be supplemented (supplemented user) among the users arranged in the content when the user supplement condition is satisfied.

As explained above, as one side of the ninth embodiment, the video game processing server 10I is configured so as to include the arranging section 11, the matching section 12, the permitting section 104, and the supplementing section 105. Thus, the permitting section 104 permits the plurality of users matched by the matching section 12 to play the content; and the supplementing section 105 supplements the user to whom the attribute to be supplemented is set and who allows to participate in the content in the middle to the content among the users arranged in the content when the user supplement condition for the content played by the plurality of users is satisfied. Therefore, it is possible to complete additional matching easily.

In this regard, it has not been mentioned particularly in the example of the ninth embodiment described above. However, the server 10I may be configured so as to preferentially supplement a user who is positioned at a front portion of a line that is composed of arranged user to the content. Namely, the server 10I may be configured so as to: refer, when a user with an attribute A secedes from a plurality of users who are playing given content, to a line constituted in a frame corresponding to the attribute A among frames corresponding to the content; judge whether each of the users allows to participate in the content in the middle or not in turn from the front portion of the line; and supplement the user to the content in a case where it is judged that the user allows to participate in the content in the middle.

In this regard, it has not been mentioned particularly in the example of the ninth embodiment described above. However, the server 10I may be configured so as to judge that the user supplement condition is satisfied when there is a supplement request for a user from the user who is playing the content. Namely, the server 10I may be configured so as to entrust the user who is playing the content to determine whether to supplement a user to the content or not.

In this regard, it has not been mentioned particularly in the example of the ninth embodiment described above. However, the server 10I may be configured so as to: receive a play request, containing a play purpose, for content in the video game from the user; and provide information regarding the content to a plurality of users matched with each other on the basis of the play purpose. By configuring the server 10I in this manner, it becomes possible to further realize the matching corresponding to a demand of the user. In this case, the server 10I may be configured so as to arrange the user on the basis of the play purpose.

Here, the play purpose means a purpose for which the user plays the content or a purpose to participate in the video game. The content of the play purpose is not limited particularly. However, it is preferable that the content of the play purpose is clear. As examples of the play purpose, there are clear of content, training of content, and support for other user in content. Here, the term "clear" means that a condition set to the content is satisfied. The content of the condition is not limited particularly, and a plurality of independent conditions may be set to one content. As examples of the plurality of condition, there are defeat of a so-called boss character, and completion of an available item. Further, the training means that clear of the content is not a purpose. Further, the term "support" means that clear of content or training is helped.

Further, the configuration to specify a play purpose is not limited particularly. However, it is preferable that such a configuration is a configuration in which the user is allowed to recognize the specified play purpose. As an example of such a configuration, there is a configuration in which the user is caused to set a play purpose. As examples of the play purpose to be selected by the user, there are clear and training. Further, the server 10I may be configured so that in a case where the content can be classified into a plurality of phases, the user is caused to select which phase is a purpose of the training. As examples of the phase, there are a former part, a middle part, and a latter part.

Further, the term "carry out matching of a plurality of users with each other on the basis of the play purpose" means that the play purpose is contained in the matching condition. As examples of the configuration to carry out matching of the plurality of users with each other on the basis of the play purpose, there are a configuration in which users who have the same play purpose are matched with each other, and a configuration in which users who have a play purpose composed of a predetermined combination are matched with each other. The content of the predetermined combination is not limited particularly. However, for example, there are a support purpose and a training purpose when a party composed of two users is created. In this regard, the server 10I may be configured so that each of a plurality of matched users can recognize a purpose of the other user with each other. As an example of such a configuration, there is a configuration in which a region that indicates a play purpose of each of the users is provided on a game screen that indicates a matching result.

Further, the term "provide information regarding the content to a plurality of users" means that information for the plurality of users to play the content is transmitted to the terminal of each of the users.

In this regard, the server 10I may be configured so as to restrict an attribute of a user to be matched when a plurality of users is matched with each other on the basis of a play purpose. Namely, the server 10I may be configured so as to reflect the attribute of each of the users to the matching when the plurality of users is matched with each other. As an example of such a configuration, there is a configuration in which in accordance with a play purpose specified by a user who hopes to be matched, an attribute of other user matched with this user is restricted. Namely, for example, there is a configuration in which with respect to a user who specifies a play purpose "complete", matching is carried out so that attributes of users in a party constituted by the matching are not overlapped. Further, for example, there is a configuration in which with respect to a user who specifies a play purpose "practice", matching is carried out so that only a part of attributes is allowed to be overlapped in a party constituted by the matching.

In this regard, it has not been mentioned particularly in the example of the ninth embodiment described above. However, the server 10I may be configured so as to: judge, on the basis of a predetermined condition, whether there is a user who is to suffer disadvantage among a plurality of users matched in accordance with a predetermined rule or not; and output a game screen indicating a judgement result. By configuring the server 10I in this manner, it becomes possible to reduce a complaint of the user about disadvantage by the matching. Namely, by showing the user that the disadvantage occurs, it is possible to prevent disadvantage that the user does not predict from occurring. In this case, the server 10I may be configured so that a user who suffers disadvantage is inquired whether to play the content with the plurality of users thus matched.

Here, the content of the disadvantage is not limited particularly. However, it is preferable that the disadvantage is one that the user can recognize to be disadvantage. As examples of the disadvantage, there is a case where a level difference among a plurality of users exceeds a threshold, and a case where users or characters respectively operated by the users are incompatible. Further, the server 10I may be configured so as to specify disadvantage of each of a plurality of users who plays the same content on the basis of a play history of the content corresponding to each of the users. Namely, for example, there is a configuration in which a reward that can be obtained by playing the content is determined on the basis of the number of users who have already cleared the content among the plurality of users who attempts to play the same content. As an example of such a configuration, there is a configuration in which one treasure box can be obtained in a case where the number of users who have already cleared the content is between one and four, and no treasure box can be obtained in a case where the number of users who have already cleared the content is five or more.

In this regard, it has not been mentioned particularly in the example of the ninth embodiment described above. However, the server 10I may be configured so as to: receive the same play request for content by each of a plurality of users; refer to a storing section configured to store the user who satisfies the predetermined condition among the plurality of users, the content, a degree of progress of the content so as to be associated with each other; and cause the plurality of users to start the same content in accordance with the degree of progress of the content corresponding to each of the users. By configuring the server 10I in this manner, it becomes possible to bring diversity to a method of utilizing the content. Namely, it is possible to carry out matching of a plurality of users with each other by eliminating restriction that the user always has to play the content from the beginning thereof, and this makes it possible to improve usability of the matching system. In this case, the content of the predetermined condition is not limited particularly. However, it is preferable that the predetermined condition is a condition that indicates a relationship among the plurality of users, or a condition regarding content that the user attempts to play. As examples of the predetermined condition, there are a condition that the user is set to a so-called "leader", and a condition that the user has never cleared the content.

Here, the configuration to receive the same play requests for content by the plurality of users is not limited particularly. The server 10I may be configured so that users assemble an arbitrary party and then can select content. Alternatively, the server 10I may be configured so as to carry out matching of the users of a predetermined number among a plurality of users who carried out the play request with respect to the same content.

Further, the configuration that the user, the content, and the degree of progress of the content are associated with each other is not limited particularly. The server 10I may be configured so as to specify the user. Alternatively, the server 10I may be configured so as to utilize the play history of the content by the user. As an example of the configuration to utilize the play history, there is a configuration in which the degree of progress when the user who is playing the content finishes playing (for example, the degree of progress when to fail clear of the content or when the user suspends or break off the play) is stored in a predetermined storage region.

Further, the term "cause a plurality of users to start the same content in accordance with the degree of progress of the content corresponding to each of the users" means that users who at least satisfy a predetermined condition are caused to play the content from a state corresponding to the degree of progress of the content. Namely, for example, in a case where a degree of progress of a user who is a leader is a "middle part", at least the leader is caused to play the content from the "middle part". In this regard, the server 10I may be configured so that the other users are caused to play the content from the "middle part" in the same manner as that of the leader. Alternatively, the server 10I may be configured so that the other users are caused to play the content from a "former part" thereof.

In this regard, when a plurality of users is caused to start the same content with the degree of progress of the content corresponding to users who satisfy a predetermined condition, a situation that a user suffers disadvantage due to skip of the degree of progress may occur. Namely, for example, in a case where a user plays the content from the "middle part", there is a case where the user loses a treasure box that appears in the "former part" of the content. For that reason, the server 10I may be configured so as to inform a user whose degree of progress is different from the degree of progress at which the content is to be started among a plurality of users that there is a possibility for the user to suffer disadvantage. In this regard, in order to avoid such a case, the server 10I may be configured so as to refer to information, in which the user and whether to allow disadvantage or not are associated with each other, to carry out the matching.

In this regard, it has not been mentioned particularly in the example of the ninth embodiment described above. However, the server 10I may be configured so that a condition of whether the content is completed or not is contained in a condition for matching of a plurality of users (that is, a matching condition).

Here, the term "complete" means that a predetermined complete condition is satisfied. The content of the complete condition is not limited particularly. However, it is preferable that the complete condition is a condition whose content the user can recognize. As examples of the complete condition, there are clear of content and collection of an item or items that can be obtained in the content.

Further, the configuration for matching of a plurality of users by using a matching condition is not limited particularly. However, it is preferable that the configuration is a configuration in which the user can recognize at least a part of the matching condition. As an example of such a configuration, there is a configuration in which a plurality of users who selects the same content is matched on the basis of a matching condition containing a fact that each of the users selected this content. Further, as another example, there is a configuration in which a predetermined condition setting screen is displayed and a user is caused to select a matching condition via this screen. The configuration of the condition setting screen is not limited particularly. However, it is preferable that the configuration is a configuration in which a user is allowed to select one or more from a plurality of matching conditions. As an example of the condition setting screen, there is one in which a region in which identification information of content, information regarding users who wait for matching, and an image for specifying a matching condition are displayed is provided. In this regard, as an example of the image for specifying a matching condition, there is an image in which whether a user has completed content or not, a purpose that the user plays the content, and a selection region for a desired practice phase are provided. Further, the server 10I may be configured so that predetermined restriction is set to selection of a matching condition. The content of the restriction is not limited particularly. However, it is preferable that the content is one related to the matching condition. As an example of such content, there is one in which a user can select a matching condition "already completed (completion of content)" in a case where the user has completed the content even once.

As explained above, one or two or more shortages are solved by each of the embodiments of the present application. In this regard, the effects by each of the embodiments are non-limiting effects or one example of effects.

In this regard, it has not been mentioned particularly in the example of each of the embodiments described above. However, the video game processing system 100 may be configured so that when a plurality of users is matched with each other, users of the predetermined number or more, who satisfy the predetermined condition, are not included in a party constituted by matching. Here, the content of the predetermined condition is not limited particularly. However, it is preferable that the predetermined condition is one regarding the play history of the user. As examples of the predetermined condition, there are a "user who has never clear the content" and a "new user". By configuring the video game processing system 100 in this manner, it is possible to correct a deviation of party configurations. This makes it possible to prevent a party from becoming a state where the party cannot clear the content, for example.

In this regard, the configuration that the users of the predetermined number or more, who satisfy the predetermined condition, are not included is not limited particularly. However, it is preferable that a waiting time of each of the users who satisfy the predetermined condition does not become longer than that of other users. As examples of the configuration that the users of the predetermined number or more, who satisfy the predetermined condition, are not included in the party, there are a configuration in which it is judged appropriately during the matching, and a configuration in which a matching result is judged. As an example of the configuration to judge it during matching, there is a configuration in which a user who satisfies a predetermined condition is not added to a party after the number of users who satisfy the predetermined condition and are included in one party becomes the predetermined number while a plurality of users is matched in turn. Further, as an example of the configuration to judge the matching result, there is a configuration in which in a case where there are users of the predetermined number or more, who satisfy the predetermined condition in the party as the matching result, the party is dissolved and the matching is carried out again, or the number of users is adjusted by exchanging a part of the users in the party with other user.

In this regard, in each of the embodiments described above, each of the plurality of user terminals 20 and 201 to 20N and the video game processing server 10 (hereinafter, referred to as the "server 10") carries out the various kinds of processing described above in accordance with various kinds of control programs (for example, a video game processing program) stored in the storage device with which the corresponding terminal or server is provided.

Further, the configuration of the video game processing system 100 is not limited to the configuration that has been explained as the example of the respective embodiments described above. For example, the video game processing system 100 may be configured so that part or all the processing that has been explained as the processing carried out by the user terminal is carried out by the server 10, or it may be configured so that part or all of the processing that has been explained as the processing carried out by the server 10 is carried out by any of the plurality of user terminals 20 and 201 to 20N (for example, the user terminal 20). Further, it may be configured so that a part or all of the storing sections included by the server 10 is included in any of the plurality of user terminals 20 and 201 to 20N. Namely, it may be configured so that a part or all of the functions included in any one of the user terminal 20 and the video game processing server 10 according to the video game processing system 100 is included in the other.

Namely, for example, the video game processing system 100 may be configured so that the video game processing server 10 generates information regarding the game screen to be outputted to a display screen of a display device, or so that the terminal 20 generates such information. In this regard, in a case where the video game processing server 10 generates the information regarding the game screen, the game screen is outputted in the terminal 20 as a game screen of a cloud gaming.

Figure 22:
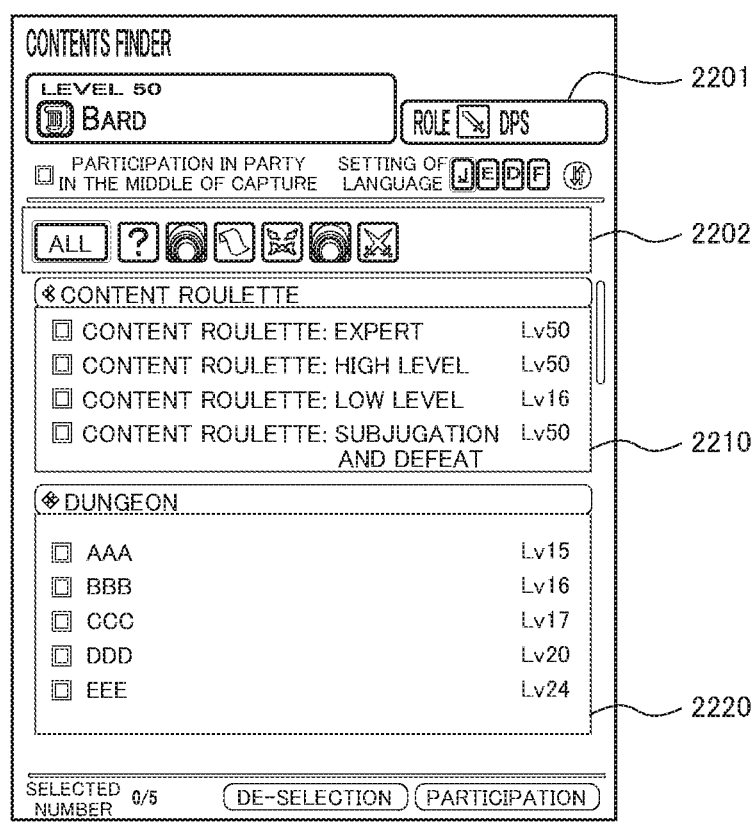
FIG. 22 is an explanatory drawing for explaining an example of a game screen corresponding to at least one of the embodiments according to the present invention.

FIG. 22 is an explanatory drawing for explaining an example of the game screen. As shown in FIG. 22, a game screen on which an attribute display region 2201, an icon display region 2202, a first display region 2210, and a second display region 2220 are provided is displayed on the display screen of the display device included in the terminal 20. An attribute of the user who operates the terminal 20 is displayed in the attribute display region 2201. An icon for restricting a kind of the content is displayed in the icon display region 2202. An image for receiving a play request in which any content is not specified is displayed in the first display region 2210. An image for receiving a play request in which content (for example, a so-called dungeon) is specified is displayed in the second display region 2220.

Further, the video game processing program may be configured so as to cause a single video game processing apparatus that does not include a communication network to realize a part or all of the functions that have been explained as the examples of the respective embodiments described above.

APPENDIX

The explanation of the embodiments described above has been described so that the following inventions can be at least realized by a person having a normal skill in the art to which the present invention belongs.

(1)

A video game processing program for causing a server to realize functions to control progress of a video game in response to an operation of a user, wherein the functions include:

an arranging function configured to arrange a user who carries out a play request for content in the video game in a frame corresponding to the content;

a matching function configured to carry out matching of a plurality of users arranged by the arranging function in turn from a head of a line, the line being constituted in the frame by the plurality of users, each of the plurality of uses satisfying a predetermined matching condition; and an extracting function configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting function being configured to extract content that satisfies an extraction condition regarding the non-cleared user waiting time from the plurality of contents, and wherein the arranging function includes a function configured to arrange the user corresponding to the play request in which any content is not specified in a frame corresponding to at least one content of the contents extracted by the extracting function.

(1-1)

The video game processing program according to example (1), wherein the functions further include:

a calculating function configured to calculate an average of a time required until the user arranged by the arranging function is matched by the matching function (hereinafter, referred to as an "average matching time"), and wherein the extracting function includes a function configured to refer, when the play request in which any content is not specified is received, to a storing section for storing an average matching time of each of the plurality of contents, and extract content that satisfies an extraction condition regarding the average matching time from the plurality of contents.

(1-1-1)

The video game processing program according to example (1-1), wherein the extracting function includes a function configured to extract contents of a predetermined number from the plurality of contents in accordance with an extraction rule using the non-cleared user waiting time and the average matching time.

(1-2)

The video game processing program according to example (1), wherein the arranging function includes a function configured to preferentially arrange a user who satisfies the non-cleared user and the matching condition in the frame corresponding to the content in which the non-cleared user is arranged.

(1-3)

The video game processing program according to example (1), wherein the extracting function includes a function configured to preferentially extract content in which the user who carried out the play request in which any content is not specified and a non-cleared user who satisfies the matching condition are arranged.

(1-4)

The video game processing program according to example (1), wherein the functions further include:

a removing function configured to remove the user from the frame in a case where the user matched by the matching function is also arranged in a frame corresponding to other content.

(2)

The video game processing program according to example (1), wherein the functions further include:

a correcting function configured to correct a numeral value regarding the user who was arranged in the content by the arranging function on the basis of a value set to the content; and a determining function configured to determine a bonus when the user played or cleared the content (hereinafter, referred to as a "correction bonus") on the basis of a value before correction and a value after correction by the correcting function.

(3)

The video game processing program according to example (1) or (2), wherein the functions further include:

a selecting function configured to select an attribute that satisfies a lacking condition with respect to the content (hereinafter, referred to as a "lacking attribute");

a specifying function configured to specify a bonus when a user to whom the same attribute as the lacking attribute is set plays or clears the content (hereinafter, referred to as a "lacking attribute bonus"); and an informing function configured to inform the user of the lacking attribute and the lacking attribute bonus so as to be associated with the content.

(3-1)

The video game processing program according to claim example (3), wherein the selecting function includes a function configured to select, as the lacking attribute, an attribute of which a time that elapses until a user is matched after the user is arranged in the content is assumed to be shorter than that of other attribute corresponding to the content every predetermined period of time, and wherein the functions further include:

a storing function configured to store the lacking attribute in a predetermined storage region so as to be associated with the content and the selected timing; and a giving function configured to refer, when a play request is received, to the storage region to give, in a case where the attribute set to the user who carried out the play request or the character operated by the user is consistent with any of the latest lacking attribute and the lacking attributes before the predetermined number from the latest one among the lacking attributes corresponding to the content indicated by the play request, the lacking attribute bonus corresponding to the consistent lacking attribute to the user when the user plays or clears the content.

(4)

The video game processing program according to any one of examples (1) to (3), wherein the functions further include:

a creating function configured to create a party that is composed of a plurality of users who plays the video game; and an allowing function configured to allow the party to play content in which at least a part of elements is restricted in a case where the party that carried out a play request for content requests to play the content by users of the number fewer than the number of users set to the content.

(5)

The video game processing program according to any one of examples (1) to (4), wherein the functions further include:

a creating function configured to create a party that is composed of a plurality of users who plays the video game; and an adjusting function configured to adjust a level of an item and an element of the content in a case where the party that carries out a play request for content possesses an item whose level exceeds an item level set to the content.

(6)

The video game processing program according to any one of examples (1) to (5), wherein the arranging function includes a function configured to arrange the user who carried out the play request in a frame corresponding to an attribute set to the user or a character operated by the user, wherein the matching function includes a function configured to carry out matching of a plurality of users who satisfies at least a matching condition regarding the attribute, and wherein the arranging function further includes a function configured to arrange the plurality of users in a frame corresponding to two kinds or more attributes so as to give priority to a state where the users to whom different attributes are respectively set are alternately arranged.

(6-1)

The video game processing program according to example (6), wherein the functions further include:

a judging function configured to refer to a storing section for storing users and attributes so as to be associated with each other to judge an attribute corresponding to the user who carried out the play request for content, and wherein the arranging function includes a function configured to arrange the user in a frame corresponding to the attribute judged by the judging function.

(7)

The video game processing program according to any one of examples (1) to (6), wherein the functions further include:

a creating function configured to create a party composed of a plurality of users, the plurality of users playing the video game, wherein the arranging function includes a function configured to arrange, when the plurality of users who belongs to the party that carried out the play request for content is arranged, the plurality of users while maintaining association among the plurality of users who belongs to the party, and wherein the matching function includes a function configured to carry out matching of the party with other user.

(7-1)

The video game processing program according to example (7), wherein the matching function includes a function configured to carry out matching of all members of the party to which the user belongs with other user when to carry out matching of anyone of the plurality of users who belongs to the party with the other user.

(7-2)

The video game processing program according to example (7), wherein the arranging function includes a function configured to arrange other users who belong to the party by using an order of a user whose time required until matching is predicted to be the shortest among the plurality of users who belong to the party as a standard.

(7-3)

The video game processing program according to example (7), wherein the matching function includes a function configured to in turn carry out matching of the plurality of parties that satisfies the matching condition regarding an attribute of the user among the plurality of parties thus arranged from the head of the line.

(8)

The video game processing program according to any one of examples (1) to (6), wherein the arranging function includes a function configured to arrange the user in the frame using an arrangement rule regarding a user who has never cleared the content (hereinafter, referred to as a "non-cleared user") in a case where the user who carried out a play request for the content has never cleared the content.

(8-1)

The video game processing program according to example (8), wherein the arranging function includes a function configured to arrange the non-cleared user at a front portion of the line so that the non-cleared user is preferentially matched compared with a user who has cleared the content previously.

(8-2)

The video game processing program according to example (8), wherein the arranging function includes a function configured to arrange the non-cleared user using an arrangement rule regarding a waiting time of each of the users who have been arranged already and a play history of the content.

(8-3)

The video game processing program according to example (8), wherein the matching function includes a function configured to carry out preferential matching of the non-cleared user compared with a user who has cleared the content previously.

(9)

The video game processing program according to any one of examples (1) to (8), wherein the functions further include:

a permitting function configured to permit the plurality of users matched by the matching function to play the content; and a supplementing function configured to supplement a user to whom an attribute to be supplemented is set and who allows to participate in the content in the middle to the content among the users arranged in the content when a user supplement condition for the content played by the plurality of users is satisfied.

(9-1)

The video game processing program according to example (9), wherein the supplementing function includes a function configured to preferentially supplement a user, who is positioned at a front portion of the line that is constituted by the arranged users, to the content.

(9-2)

The video game processing program according to example (9), wherein the supplementing function includes a function configured to judge that the user supplement condition is satisfied when there is a supplement request for a user from the user who is playing the content.

(10)

A video game processing program for causing a user terminal to realize at least one function of the functions that the server is caused to realize in accordance with the video game processing program according to any one of examples (1) to (9), the user terminal being allowed to communicate with the server.

(11)

A server in which the video game processing program described in any one of examples (1) to (10).

(12)

A video game processing system including a communication network, a server, and a user terminal, the video game processing system being configured to control progress of a video game in response to an operation of a user, the video game processing system comprising:

an arranging section configured to arrange a user who carries out a play request for content in the video game in a frame corresponding to the content;

a matching section configured to carry out matching of a plurality of users arranged by the arranging section in turn from a head of a line, the line being constituted in the frame by the plurality of users, each of the plurality of uses satisfying a predetermined matching condition; and an extracting section configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting section being configured to extract content that satisfies an extraction condition regarding the non-cleared user waiting time from the plurality of contents, and wherein the arranging section is configured to arrange the user corresponding to the play request in which any content is not specified in a frame corresponding to at least one content of the contents extracted by the extracting section.

(13)

The video game processing system according to example (12), wherein the server includes the arranging section, the matching section, and the extracting section, and wherein the user terminal includes:

an outputting section configured to output information regarding the arrangement (for example, an arrangement result) to a display screen of a display device.

(14)

A video game processing program for causing a user terminal to realize functions to control progress of a video game in response to an operation inputted to the user terminal by a user, wherein a server includes:

an arranging function configured to arrange a user who carries out a play request for content in the video game in a frame corresponding to the content;

a matching function configured to carry out matching of a plurality of users arranged by the arranging function in turn from a head of a line, the line being constituted in the frame by the plurality of users, each of the plurality of uses satisfying a predetermined matching condition; and an extracting function configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting function being configured to extract content that satisfies an extraction condition regarding the non-cleared user waiting time from the plurality of contents, wherein the arranging function includes a function configured to arrange the user corresponding to the play request in which any content is not specified in a frame corresponding to at least one content of the contents extracted by the extracting function, and wherein the functions include:

a receiving function configured to receive information for outputting information regarding the arrangement (for example, an arrangement result) from the server.

(15)

A video game processing program for causing a user terminal to realize functions to control progress of a video game in response to an operation inputted to the user terminal by a user, wherein the functions include:

an arranging function configured to arrange a user who carries out a play request for content in the video game in a frame corresponding to the content;

a matching function configured to carry out matching of a plurality of users arranged by the arranging function in turn from a head of a line, the line being constituted in the frame by the plurality of users, each of the plurality of uses satisfying a predetermined matching condition; and an extracting function configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting function being configured to extract content that satisfies an extraction condition regarding the non-cleared user waiting time from the plurality of contents, and wherein the arranging function includes a function configured to arrange the user corresponding to the play request in which any content is not specified in a frame corresponding to at least one content of the contents extracted by the extracting function.

(16)

A video game processing program for causing a server to realize at least one function of the functions that the video game processing program according to example (15) causes the user terminal to realize, the user terminal being allowed to communicate with the server.

(17)

A user terminal in which the video game processing program described in example (15) or (16) is installed.

(18)

A video game processing method of controlling progress of a video game in response to an operation of a user, the video game processing method comprising:

an arranging process configured to arrange a user who carries out a play request for content in the video game in a frame corresponding to the content;

a matching process configured to carry out matching of a plurality of users arranged by the arranging process in turn from a head of a line, the line being constituted in the frame by the plurality of users, each of the plurality of uses satisfying a predetermined matching condition; and an extracting process configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting process being configured to extract content that satisfies an extraction condition regarding the non-cleared user waiting time from the plurality of contents, and wherein in the arranging process, the user corresponding to the play request in which any content is not specified in a frame corresponding to at least one content of the contents extracted in the extracting process is arranged.

(19)

A video game processing method carried out by a video game processing system to control progress of a video game in response to an operation inputted to a user terminal by a user, the video game processing system comprising a communication network, a server, and the user terminal, the video game processing method comprising:

an arranging process configured to arrange a user who carries out a play request for content in the video game in a frame corresponding to the content;

a matching process configured to carry out matching of a plurality of users arranged by the arranging process in turn from a head of a line, the line being constituted in the frame by the plurality of users, each of the plurality of uses satisfying a predetermined matching condition; and an extracting process configured to refer, when a play request in which any content is not specified is received, to a storing section in which a time that elapses since at least a user who has never cleared content in which the user is arranged among users arranged in each of a plurality of contents was arranged (hereinafter, referred to as a "non-cleared user waiting time") is stored so as to be associated with the content, the extracting process being configured to extract content that satisfies an extraction condition regarding the non-cleared user waiting time from the plurality of contents, and wherein in the arranging process, the user corresponding to the play request in which any content is not specified in a frame corresponding to at least one content of the contents extracted in the extracting process is arranged.

INDUSTRIAL APPLICABILITY

According to one of the embodiments of the present invention, it is useful to reduce, when a plurality of users is matched with each other, stress of each of the users, which may occur until the matching is completed.

EXPLANATION OF REFERENCE NUMERALS 10 video game processing server
11 arranging section
12 matching section
13 storing section
14 extracting section
15 correcting section
16 determining section
17 selecting section
18 specifying section
19 informing section
101 creating section
102 allowing section
103 adjusting section
104 permitting section
105 supplementing section
20, 201 to 20N user terminal
30 communication network
100 video game processing system

The invention claimed is:

1. A non-transitory computer-readable medium including a video game processing program for causing a server to realize functions to control progress of a video game in response to a user operation, the functions comprising:

an arranging function configured to arrange a first user that carries out a first play request for a first content of a plurality of contents in the video game in a first frame corresponding to the first content;

a matching function configured to carry out matching of a first plurality of users arranged by the arranging function in turn from a head of a line, the line being provided in the first frame and constituted by the first plurality of users, each of the first plurality of users satisfying a predetermined matching condition; and an extracting function configured to refer, when a second user carries out a second play request in which any of the plurality of contents is not specified, to a storage in which a non-cleared user waiting time that elapses since at least a non-cleared user that has never cleared a second content of the plurality of contents for which the non-cleared user is arranged is stored so as to be associated with the second content, the extracting function being configured to extract the second content that satisfies an extraction condition regarding the non-cleared user waiting time from the plurality of contents, and wherein the arranging function is configured to arrange the second user corresponding to the second play request in which any of the plurality of contents is not specified in a second frame corresponding to the plurality of contents.

2. The non-transitory computer-readable medium according to claim 1, the functions further comprising:

a correcting function configured to correct a numeral value regarding the first user that is arranged in the first frame by the arranging function based on a content value set to the first content; and a determining function configured to determine a correction bonus when the first user plays or clears the first content based on the numeral value before correction and the numeral value after correction by the correcting function.

3. The non-transitory computer-readable medium according to claim 2, the functions further comprising:

a selecting function configured to select a lacking attribute that satisfies a lacking condition with respect to a third content of the plurality of contents;

a specifying function configured to specify a lacking attribute bonus when a third user of the plurality of users to which the lacking attribute is set plays or clears the third content; and an informing function configured to inform the third user of the lacking attribute and the lacking attribute bonus associated with the third content.

4. The non-transitory computer-readable medium according to claim 3, the functions further comprising:

a creating function configured to create a party that is composed of a second plurality of users that plays the video game; and an allowing function configured to allow the party to play a first party content in which at least a part of elements is restricted when the party carries out a first party play request to play the first party content and a number of users of the second plurality of users is fewer than a number of users set to the first party content.

5. The non-transitory computer-readable medium according to claim 4, the functions further comprising:

an adjusting function configured to adjust a level of an item and an element of a second party content when the party that carries out a second party play request to play the second party content possesses the item and the level of the item exceeds an item level set to the second party content.

6. The non-transitory computer-readable medium according to claim 3, the functions further comprising:
- a creating function configured to create a party that is composed of a second plurality of users that plays the video game; and
- an adjusting function configured to adjust a level of an item and an element of a second party content when the party that carries out a second party play request to play the second party content possesses the item and the level of the item exceeds an item level set to the second party content.

7. The non-transitory computer-readable medium according to claim 2, the functions further comprising:
- a creating function configured to create a party that is composed of a second plurality of users that plays the video game; and
- an allowing function configured to allow the party to play a first party content in which at least a part of elements is restricted when the party carries out a first party play request to play the first party content and a number of users of the second plurality of users is fewer than a number of users set to the first party content.

8. The non-transitory computer-readable medium according to claim 7, the functions further comprising:
- an adjusting function configured to adjust a level of an item and an element of a second party content where when the party that carries out a second party play request to play the second party content possesses the item and the level of the item exceeds an item level set to the second party content.

9. The non-transitory computer-readable medium according to claim 2, the functions further comprising:
- a creating function configured to create a party that is composed of a second plurality of users that plays the video game; and
- an adjusting function configured to adjust a level of an item and an element of a second party content when the party that carries out a second party play request to play the second party content possesses the item and the level of the item exceeds an item level set to the second party content.

10. The non-transitory computer-readable medium according to claim 1, the functions further comprising:
- a selecting function configured to select a lacking attribute that satisfies a lacking condition with respect to a third content of the plurality of contents;
- a specifying function configured to specify a lacking attribute bonus when a third user of the plurality of users to which the lacking attribute is set plays or clears the third content; and
- an informing function configured to inform the third user of the lacking attribute and the lacking attribute bonus associated with the third content.

11. The non-transitory computer-readable medium according to claim 10, the functions further comprising:
- a creating function configured to create a party that is composed of a second plurality of users that plays the video game; and
- an allowing function configured to allow the party to play a first party content in which at least a part of elements is restricted when the party carries out a first party play request to play the first party content and a number of users of the second plurality of users is fewer than a number of users set to the first party content.

12. The non-transitory computer-readable medium according to claim 11, the functions further comprising:
- an adjusting function configured to adjust a level of an item and an element of a second party content when the party that carries out a second party play request to play the second party content possesses the item and the level of the item exceeds an item level set to the second party content.

13. The non-transitory computer-readable medium according to claim 10, the functions further comprising:
- a creating function configured to create a party that is composed of a second plurality of users that plays the video game; and
- an adjusting function configured to adjust a level of an item and an element of a second party content when the party that carries out a second party play request to play the second party content possesses the item and the level of the item exceeds an item level set to the second party content.

14. The non-transitory computer-readable medium according to claim 1, the functions further comprising:
- a creating function configured to create a party that is composed of a second plurality of users that plays the video game; and
- an allowing function configured to allow the party to play a first party content in which at least a part of elements is restricted when the party carries out a first party play request to play the first party content and a number of users of the second plurality of users is fewer than a number of users set to the first party content.

15. The non-transitory computer-readable medium according to claim 14, the functions further comprising:
- an adjusting function configured to adjust a level of an item and an element of a second party content when the party that carries out a second party play request to play the second party content possesses the item and the level of the item exceeds an item level set to the second party content.

16. The non-transitory computer-readable medium according to claim 1, the functions further comprising:
- a creating function configured to create a party that is composed of a second plurality of users that plays the video game; and
- an adjusting function configured to adjust a level of an item and an element of a second party content when the party that carries out a second party play request to play the second party content possesses the item and the level of the item exceeds an item level set to the second party content.

17. The non-transitory computer-readable medium according to claim 1, wherein the arranging function is further configured to arrange, when the second content is the first content, the non-cleared user at a front portion of the line provided in the first frame.

18. The non-transitory computer-readable medium according to claim 1, wherein the arranging function is further configured to arrange, when the second content is the first content, the non-cleared user before first user in the line provided in the first frame when the first user has cleared the first content and a cleared user waiting time of the first user is less than a predetermined period of time.

19. A video game processing system configured to control progress of a video game in response to a user operation, the video game processing system comprising:
- a server; and
- a user terminal configured to communicate with the server via a communication network, wherein the server is configured to arrange a first user that carries out a first play request for a first content of a plurality of contents in the video game in a first frame corresponding to the first content, the server is further configured to carry out matching of a plurality of users arranged by the server in turn from a head of a line, the line being provided in the first frame and constituted by the plurality of users, each of the plurality of users satisfying a predetermined matching condition, the server is further configured to refer, when a second user carries out a second play request in which any of the plurality of contents is not specified, to a storage in which a non-cleared user waiting time that elapses since at least a non-cleared user that has never cleared a second content of the plurality of contents for which the non-cleared user is arranged is stored so as to be associated with the second content, the server being configured to extract the second content that satisfies an extraction condition regarding the non-cleared user waiting time from the plurality of contents, and wherein the server is configured to arrange the second user corresponding to the second play request in which any of the plurality of contents is not specified in a second frame corresponding to the plurality of contents.

20. A non-transitory computer-readable medium including a video game processing program for causing a user terminal to realize functions to control progress of a video game in response to a user operation inputted to the user terminal by a first user, the user terminal being configured to communicate with a server via a communication network, the server being configured to:
arrange a first user that carries out a first play request for a first content of a plurality of contents in the video game in a first frame corresponding to the first content;

carry out matching of a plurality of users arranged by the arranging function in turn from a head of a line, the line being provided in the first frame and constituted by the plurality of users, each of the plurality of users satisfying a predetermined matching condition; and refer, when a second user carries out a second play request in which any of the plurality of contents is not specified, to a storage in which a non-cleared user waiting time that elapses since at least a non-cleared user that has never cleared a second content of the plurality of contents for which the non-cleared user is arranged is stored so as to be associated with the second content, the server being configured to extract the second content that satisfies an extraction condition regarding the non-cleared user waiting time from the plurality of contents, the server being further configured to arrange the second user corresponding to the second play request in which any content of the plurality of contents is not specified in a second frame corresponding to the plurality of contents, the functions comprising:
a receiving function configured to receive, from the server and for output, information regarding an arrangement of the first user in the first frame.

* * * * *

UNITED STATES PATENT AND TRADEMARK OFFICE
CERTIFICATE OF CORRECTION

PATENT NO. : 10,786,732 B2  
APPLICATION NO. : 15/735826  
DATED : September 29, 2020  
INVENTOR(S) : J. Takemura et al.

Page 1 of 1

It is certified that error appears in the above-identified patent and that said Letters Patent is hereby corrected as shown below:

In the Claims

At Column 41, Line 27 (Claim 8, Line 4), please change "content where" to --content--.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*